(12) United States Patent
Rigo et al.

(10) Patent No.: US 11,197,355 B2
(45) Date of Patent: Dec. 7, 2021

(54) METHOD AND DEVICE FOR ELECTROMAGNETIC COOKING USING NON-CENTERED LOADS

(71) Applicant: WHIRLPOOL CORPORATION, Benton Harbor, MI (US)

(72) Inventors: Mattia Rigo, Varese (IT); Davide Guatta, Brescia (IT)

(73) Assignee: Whirlpool Corporation, Benton Harbor, MI (US)

(*) Notice: Subject to any disclaimer, the term of this patent is extended or adjusted under 35 U.S.C. 154(b) by 198 days.

(21) Appl. No.: 16/308,082

(22) PCT Filed: Dec. 22, 2016

(86) PCT No.: PCT/US2016/068278
§ 371 (c)(1),
(2) Date: Dec. 7, 2018

(87) PCT Pub. No.: WO2018/118065
PCT Pub. Date: Jun. 28, 2018

(65) Prior Publication Data
US 2019/0306934 A1 Oct. 3, 2019

(51) Int. Cl.
*H05B 6/70* (2006.01)
*H05B 6/72* (2006.01)
*H05B 6/68* (2006.01)

(52) U.S. Cl.
CPC ............ *H05B 6/705* (2013.01); *H05B 6/681* (2013.01); *H05B 6/70* (2013.01); *H05B 6/72* (2013.01)

(58) Field of Classification Search
CPC . H05B 6/681; H05B 6/72; H05B 6/70; H05B 6/705; Y02B 40/00
(Continued)

(56) References Cited

U.S. PATENT DOCUMENTS 3,536,129 A 10/1970 White
3,603,241 A 9/1971 Drucker
(Continued)

FOREIGN PATENT DOCUMENTS

CN 103175237 A 6/2013
EP 0550312 A2 7/1993
(Continued)

*Primary Examiner* — Quang T Van
(74) *Attorney, Agent, or Firm* — Price Heneveld LLP

(57) ABSTRACT

An electromagnetic cooking device includes a cavity in which a food load is placed, a plurality of RF feeds for introducing electromagnetic radiation into the enclosed cavity, and a controller configured to select a heating target including a plurality of unrotated resonant modes; detect asymmetries of the food load relative to a center of the enclosed cavity and select rotations for the plurality of unrotated resonant modes that compensate for the detected asymmetries of the food load to generate a plurality of optimized resonant modes; generate a heating strategy having a selected sequence of the optimized resonant modes; cause the RF feeds to excite the enclosed cavity with a selected set of phasors for a set of frequencies corresponding to each resonant mode of the selected sequence of optimized resonant modes; and monitor the created heating patterns using closed-loop regulation to selectively modify the sequence of optimized resonant modes.

20 Claims, 26 Drawing Sheets

(58) Field of Classification Search
USPC ....... 219/747, 746, 702, 709, 716, 717, 693,
219/697, 696, 750, 748, 756, 761, 762;
118/723 ME, 723 MW, 723 MP;
156/345.36, 643.1
See application file for complete search history.

(56) References Cited

U.S. PATENT DOCUMENTS

| | | | |
|---|---|---|---|
| 3,835,921 A | 9/1974 | Faris et al. | |
| 4,196,332 A | 4/1980 | MacKay et al. | |
| 4,210,795 A | 7/1980 | Lentz | |
| 4,374,319 A | 2/1983 | Guibert | |
| 4,481,519 A | 11/1984 | Margerum | |
| 4,777,336 A | 10/1988 | Asmussen | |
| 4,831,239 A | 5/1989 | Ueda | |
| 4,868,357 A | 9/1989 | Serikawa et al. | |
| 4,996,403 A | 2/1991 | White | |
| 5,008,506 A | 4/1991 | Asmussen et al. | |
| 5,094,865 A | 3/1992 | Levinson | |
| 5,293,019 A | 3/1994 | Lee | |
| 5,360,965 A | 11/1994 | Ishii et al. | |
| 5,361,681 A | 11/1994 | Hedstrom et al. | |
| 5,369,253 A | 11/1994 | Kuwata et al. | |
| 5,389,764 A | 2/1995 | Nishii et al. | |
| 5,512,736 A | 4/1996 | Kang et al. | |
| 5,521,360 A | 5/1996 | Johnson et al. | |
| 5,632,921 A | 5/1997 | Risman et al. | |
| 5,648,038 A | 7/1997 | Fathi et al. | |
| 5,681,496 A | 10/1997 | Brownlow et al. | |
| 5,756,970 A | 5/1998 | Barger et al. | |
| 5,828,042 A | 10/1998 | Choi et al. | |
| 5,961,871 A | 10/1999 | Bible et al. | |
| 6,034,363 A | 3/2000 | Barmatz et al. | |
| 6,066,838 A | 5/2000 | Koda et al. | |
| 6,150,645 A | 11/2000 | Lewis et al. | |
| 6,172,348 B1 | 1/2001 | Yoshino et al. | |
| 6,559,882 B1 | 5/2003 | Kerchner | |
| 6,884,979 B1 | 4/2005 | Torngren et al. | |
| 7,105,787 B2 | 9/2006 | Clemen, Jr. | |
| 7,111,247 B2 | 9/2006 | Choi et al. | |
| 7,191,698 B2 | 3/2007 | Bond et al. | |
| 7,326,888 B2 | 2/2008 | Chun et al. | |
| 7,461,588 B2 | 12/2008 | Head | |
| 7,501,608 B2 | 3/2009 | Hallgren et al. | |
| 7,923,664 B2 | 4/2011 | Kruempelmann et al. | |
| 7,992,552 B2 | 8/2011 | Hirano et al. | |
| 8,207,479 B2 | 6/2012 | Ben-Shmuel et al. | |
| 8,218,402 B2 | 7/2012 | Lewis et al. | |
| 8,283,605 B2 | 10/2012 | Arione et al. | |
| 8,324,540 B2 | 12/2012 | Nordh et al. | |
| 8,330,085 B2 | 12/2012 | Ishizaki et al. | |
| 8,338,763 B2 | 12/2012 | Nordh et al. | |
| 8,389,916 B2 | 3/2013 | Ben-Shmuel et al. | |
| 8,610,038 B2 | 12/2013 | Hyde et al. | |
| 8,742,305 B2 | 6/2014 | Simunovic et al. | |
| 8,742,306 B2 | 6/2014 | Atzmony et al. | |
| 8,839,527 B2 | 9/2014 | Ben-Shmuel et al. | |
| 8,922,969 B2 | 12/2014 | Sigalov et al. | |
| 8,927,913 B2 | 1/2015 | Hyde et al. | |
| 9,035,224 B2 | 5/2015 | Lim et al. | |
| 9,040,879 B2 | 5/2015 | Libman et al. | |
| 9,078,298 B2 | 7/2015 | Ben-Shmuel et al. | |
| 9,131,543 B2 | 9/2015 | Ben-Shmuel et al. | |
| 9,132,408 B2 | 9/2015 | Einziger et al. | |
| 9,161,390 B2 | 10/2015 | Gelbart et al. | |
| 9,161,394 B2 | 10/2015 | Carlsson et al. | |
| 9,167,633 B2 | 10/2015 | Ben-Shmuel et al. | |
| 9,210,740 B2 | 12/2015 | Libman et al. | |
| 9,215,756 B2 | 12/2015 | Bilchinsky et al. | |
| 9,301,344 B2 | 3/2016 | Ibragimov et al. | |
| 9,307,583 B2 | 4/2016 | Sim et al. | |
| 9,332,591 B2 | 5/2016 | Libman et al. | |
| 9,351,347 B2 | 5/2016 | Torres et al. | |
| 9,363,852 B2 | 6/2016 | Carlsson et al. | |
| 9,363,854 B2 | 6/2016 | Sim et al. | |
| 9,374,852 B2 | 6/2016 | Bilchinsky et al. | |
| 9,398,644 B2 | 7/2016 | Okajima | |
| 9,398,646 B2 | 7/2016 | Nobue et al. | |
| 9,414,444 B2 | 8/2016 | Libman et al. | |
| 9,459,346 B2 | 10/2016 | Einziger et al. | |
| 9,462,635 B2 | 10/2016 | Bilchinsky et al. | |
| 9,462,642 B2 | 10/2016 | Chu et al. | |
| 2003/0070799 A1 | 4/2003 | Mueller et al. | |
| 2006/0191926 A1 | 8/2006 | Ray et al. | |
| 2008/0105675 A1 | 5/2008 | Choi et al. | |
| 2008/0297208 A1 | 12/2008 | Baudin et al. | |
| 2009/0011101 A1 | 1/2009 | Doherty et al. | |
| 2009/0236333 A1 | 9/2009 | Ben-Shmuel et al. | |
| 2009/0321428 A1 | 12/2009 | Hyde et al. | |
| 2010/0059509 A1 | 3/2010 | Imai et al. | |
| 2010/0176121 A1 | 7/2010 | Nobue et al. | |
| 2010/0176123 A1* | 7/2010 | Mihara | H05B 6/686 219/746 |
| 2010/0182136 A1 | 7/2010 | Pryor | |
| 2010/0187224 A1 | 7/2010 | Hyde et al. | |
| 2010/0231506 A1 | 9/2010 | Pryor | |
| 2011/0139773 A1 | 6/2011 | Fagrell et al. | |
| 2011/0297672 A1* | 12/2011 | Niklasson | H05B 6/6402 219/702 |
| 2012/0067873 A1 | 3/2012 | Mihara et al. | |
| 2012/0103972 A1 | 5/2012 | Okajima | |
| 2012/0168645 A1 | 7/2012 | Atzmony et al. | |
| 2012/0312801 A1 | 12/2012 | Bilchinsky et al. | |
| 2013/0048881 A1 | 2/2013 | Einziger et al. | |
| 2013/0056460 A1 | 3/2013 | Ben-Shmuel et al. | |
| 2013/0080098 A1 | 3/2013 | Hadad et al. | |
| 2013/0142923 A1 | 6/2013 | Torres et al. | |
| 2013/0146590 A1 | 6/2013 | Einziger et al. | |
| 2013/0186887 A1 | 7/2013 | Hallgren et al. | |
| 2013/0206752 A1 | 8/2013 | Moon et al. | |
| 2013/0240757 A1 | 9/2013 | Einziger et al. | |
| 2013/0313250 A1 | 11/2013 | Ibragimov et al. | |
| 2013/0334215 A1 | 12/2013 | Chen et al. | |
| 2014/0063676 A1 | 3/2014 | Sigalov et al. | |
| 2014/0203012 A1 | 7/2014 | Corona et al. | |
| 2014/0287100 A1 | 9/2014 | Libman | |
| 2014/0305934 A1 | 10/2014 | DeCamillis et al. | |
| 2015/0070029 A1 | 3/2015 | Libman et al. | |
| 2015/0136760 A1 | 5/2015 | Lima et al. | |
| 2015/0156823 A1 | 6/2015 | Okajima | |
| 2015/0156827 A1 | 6/2015 | Ibragimov et al. | |
| 2015/0271877 A1 | 9/2015 | Johansson | |
| 2015/0346335 A1 | 12/2015 | Einziger et al. | |
| 2015/0366006 A1 | 12/2015 | Ben-Shmuel et al. | |
| 2016/0073453 A1 | 3/2016 | Hyde et al. | |
| 2016/0095171 A1 | 3/2016 | Chaimov et al. | |
| 2016/0128138 A1 | 5/2016 | Li et al. | |
| 2016/0205973 A1 | 7/2016 | An et al. | |
| 2016/0249416 A1 | 8/2016 | Elboim et al. | |
| 2016/0273970 A1 | 9/2016 | Alon et al. | |
| 2016/0278170 A1 | 9/2016 | Atherton et al. | |
| 2016/0323940 A1 | 11/2016 | Guatta | |
| 2016/0330803 A1 | 11/2016 | Guatta | |
| 2019/0150233 A1* | 5/2019 | Guatta | H05B 6/686 219/750 |

FOREIGN PATENT DOCUMENTS

| | | |
|---|---|---|
| EP | 1076475 A2 | 2/2001 |
| EP | 1193584 A1 | 4/2002 |
| EP | 1471773 A2 | 10/2004 |
| EP | 1795814 A2 | 6/2007 |
| EP | 2051564 A2 | 4/2009 |
| EP | 2512206 A1 | 10/2012 |
| EP | 2824991 A1 | 1/2015 |
| EP | 2446703 B1 | 4/2015 |
| EP | 2446704 B1 | 4/2015 |
| EP | 2446705 B1 | 4/2015 |
| EP | 2906021 A1 | 8/2015 |
| EP | 2916619 A1 | 9/2015 |
| EP | 2446706 B1 | 1/2016 |
| EP | 2205043 B1 | 1/2017 |
| EP | 2239994 B1 | 11/2018 |
| FR | 2766272 A1 | 1/1999 |

(56) References Cited

FOREIGN PATENT DOCUMENTS

| | | | |
|---|---|---|---|
| GB | 2193619 | A | 2/1988 |
| RU | 2253193 | C2 | 5/2005 |
| WO | 9107069 | | 5/1991 |
| WO | 9835532 | A1 | 8/1998 |
| WO | 9913688 | | 3/1999 |
| WO | 0036880 | | 6/2000 |
| WO | 0223953 | A1 | 3/2002 |
| WO | 2008018466 | A1 | 2/2008 |
| WO | 2010052724 | A2 | 5/2010 |
| WO | 2011058537 | A1 | 5/2011 |
| WO | 2011108016 | A1 | 9/2011 |
| WO | 2011138675 | A2 | 11/2011 |
| WO | 2011138688 | A2 | 11/2011 |
| WO | 2012052894 | A1 | 4/2012 |
| WO | 2012162072 | A1 | 11/2012 |
| WO | 2013078325 | A1 | 5/2013 |
| WO | 2014006510 | A2 | 1/2014 |
| WO | 2014024044 | A1 | 2/2014 |
| WO | 2015099651 | A1 | 7/2015 |
| WO | 2015127999 | A1 | 9/2015 |
| WO | 2016144872 | A1 | 9/2016 |
| WO | 2016196939 | A1 | 12/2016 |

* cited by examiner

METHOD AND DEVICE FOR ELECTROMAGNETIC COOKING USING NON-CENTERED LOADS

BACKGROUND

The present device generally relates to a method and device for electromagnetic cooking, and more specifically, to a method and device for determining and controlling the resonant modes within a microwave oven.

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water.

To generate microwave frequency radiation in a conventional microwave, a voltage applied to a high-voltage transformer results in a high-voltage power that is applied to a magnetron that generates microwave frequency radiation. The microwaves are then transmitted to an enclosed cavity containing the food through a waveguide. Cooking food in an enclosed cavity with a single, non-coherent source like a magnetron can result in non-uniform heating of the food. To more evenly heat food, microwave ovens include, among other things, mechanical solutions such as a microwave stirrer and a turntable for rotating the food. A common magnetron-based microwave source is not narrowband and not tunable (i.e. emits microwaves at a frequency that is changing over time and not selectable). As an alternative to such a common magnetron-based microwave source, solid-state sources can be included in microwave ovens which are tunable and coherent.

SUMMARY

In one aspect, an electromagnetic cooking device includes an enclosed cavity in which a food load is placed; a plurality of RF feeds configured to introduce electromagnetic radiation into the enclosed cavity to heat up and prepare the food load, the plurality of RF feeds configured to allow measurement of forward and backward power at the plurality of RF feeds; and a controller configured to: select a heating target corresponding to an amount of energy that is to be to delivered to each symmetry plane in the enclosed cavity based in part upon the food load positioned in the enclosed cavity where the heating target includes a plurality of unrotated resonant modes; detect asymmetries relative to a center of the enclosed cavity and select rotations for the plurality of unrotated resonant modes that compensate for the detected asymmetries so as to generate a plurality of optimized resonant modes; generate a heating strategy based on the heating target and the selected rotations to determine a sequence of desired heating patterns, the heating strategy having a selected sequence of the plurality of optimized resonant modes to be excited in the enclosed cavity that corresponds to the sequence of desired heating patterns; cause the RF feeds to output a radio frequency signal of a selected frequency, a selected phase value and a selected power level to thereby excite the enclosed cavity with a selected set of phasors for a set of frequencies corresponding to each resonant mode of the selected sequence of optimized resonant modes to create heating patterns; and monitor the created heating patterns based on the forward and backward power measurements at the RF feeds to use closed-loop regulation to selectively modify the sequence of optimized resonant modes into the enclosed cavity based on the desired heating patterns as monitored.

In another aspect, a method of activating a sequence of preclassified resonant modes into an enclosed cavity in which a food load is placed to control a heating pattern therein with RF radiation from a plurality of RF feeds, where the plurality of RF feeds transfer the RF radiation into the enclosed cavity and measure the forward and backward power at the plurality of RF feeds, the method comprising: selecting a heating target corresponding to an amount of energy that is to be to delivered to each symmetry plane in the enclosed cavity based in part upon the food load positioned in the enclosed cavity where the heating target includes a plurality of unrotated resonant modes; detecting asymmetries relative to a center of the enclosed cavity and select rotations for the plurality of unrotated resonant modes that compensate for the detected asymmetries so as to generate a plurality of optimized resonant modes; generating a heating strategy based on the heating target and the selected rotations to determine a sequence of desired heating patterns, the heating strategy having a selected sequence of the plurality of optimized resonant modes to be excited in the enclosed cavity that corresponds to the sequence of desired heating patterns; exciting the enclosed cavity with a selected set of phasors for a set of frequencies corresponding to each resonant mode of the selected sequence of optimized resonant modes to create heating patterns; and monitoring the created heating patterns based on the forward and backward power measurements at the RF feeds to use closed-loop regulation to selectively modify the sequence of optimized resonant modes into the enclosed cavity based on the desired heating patterns as monitored.

DETAILED DESCRIPTION

It is to be understood that the specific devices and processes illustrated in the attached drawings, and described in the following specification are simply exemplary embodiments of the inventive concepts defined in the appended claims. Hence, other physical characteristics relating to the embodiments disclosed herein are not to be considered as limiting, unless the claims expressly state otherwise.

A solid-state radio frequency (RF) cooking appliance heats up and prepares food by introducing electromagnetic radiation into an enclosed cavity. Multiple RF feeds at different locations in the enclosed cavity produce dynamic electromagnetic wave patterns as they radiate. To control and shape of the wave patterns in the enclosed cavity, the multiple RF feeds can radiate waves with separately controlled electromagnetic characteristics to maintain coherence (that is, a stationary interference pattern) within the enclosed cavity. For example, each RF feed can transmit a different frequency, phase and/or amplitude with respect to the other feeds. Other electromagnetic characteristics can be common among the RF feeds. For example, each RF feed can transmit at a common but variable frequency. Although the following embodiments are directed to a cooking appliance where RF feeds direct electromagnetic radiation to heat an object in an enclosed cavity, it will be understood that the methods described herein and the inventive concepts derived therefrom are not so limited. The covered concepts and methods are applicable to any RF device where electromagnetic radiation is directed to an enclosed cavity to act on an object inside the cavity. Exemplary devices include ovens, dryers, steamers, and the like.

Figure 1:
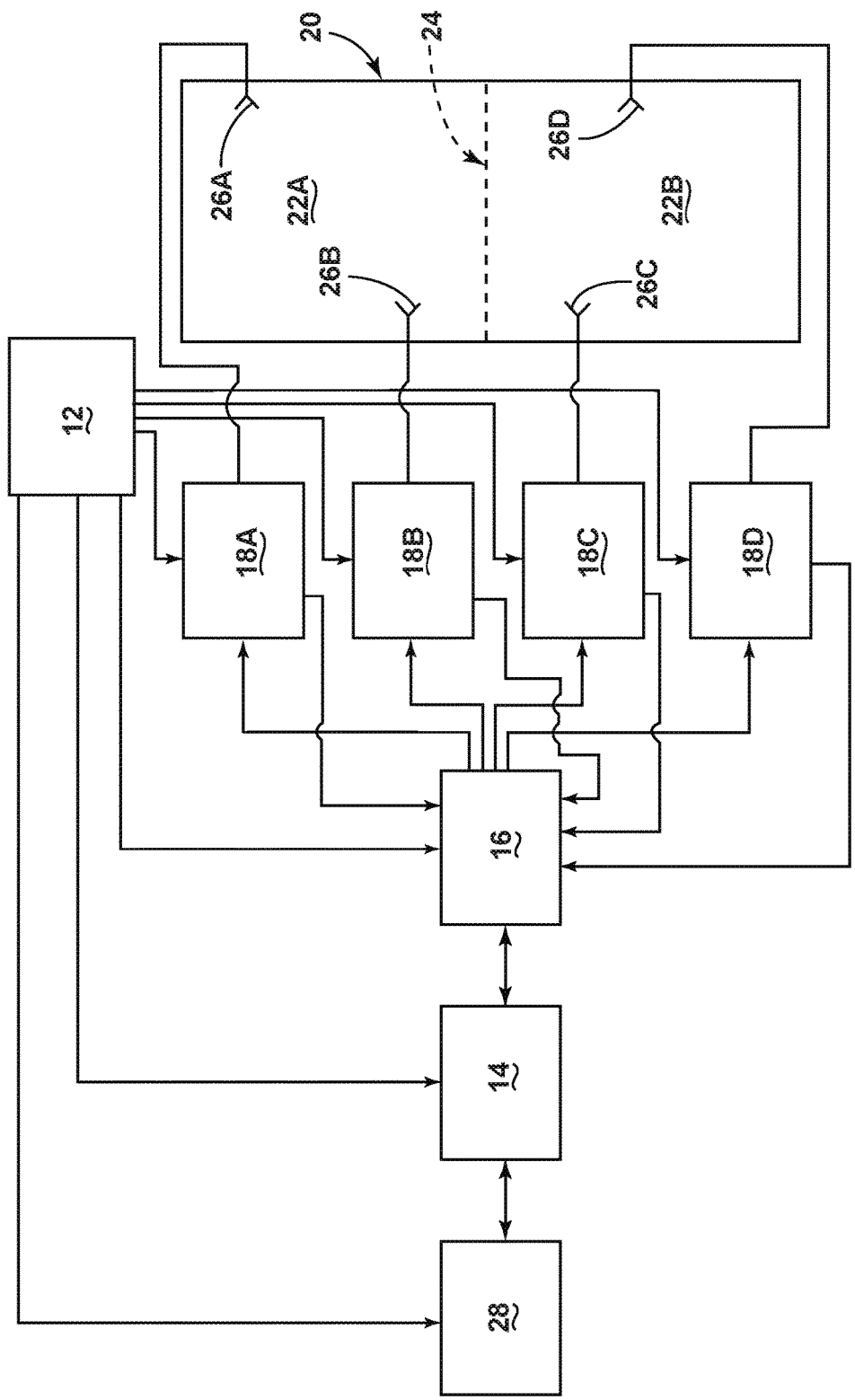
FIG. 1 is a block diagram of an electromagnetic cooking device with multiple coherent radio frequency feeds in accordance with various aspects described herein.

FIG. 1 shows a block diagram of an electromagnetic cooking device 10 with multiple coherent RF feeds 26A-D according to one embodiment. As shown in FIG. 1, the electromagnetic cooking device 10 includes a power supply 12, a controller 14, an RF signal generator 16, a human-machine interface 28 and multiple high-power RF amplifiers 18A-D coupled to the multiple RF feeds 26A-D. The multiple RF feeds 26A-D each transfer RF power from one of the multiple high-power RF amplifiers 18A-D into an enclosed cavity 20.

The power supply 12 provides electrical power derived from mains electricity to the controller 14, the RF signal generator 16, the human-machine interface 28 and the multiple high-power RF amplifiers 18A-D. The power supply 12 converts the mains electricity to the required power level of each of the devices it powers. The power supply 12 can deliver a variable output voltage level. For example, the power supply 12 can output a voltage level selectively controlled in 0.5-Volt steps. In this way, the power supply 12 can be configured to typically supply 28 Volts direct current to each of the high-power RF amplifiers 18A-D, but can supply a lower voltage, such as 15 Volts direct current, to decrease an RF output power level by a desired level.

A controller 14 can be included in the electromagnetic cooking device 10, which can be operably coupled with various components of the electromagnetic cooking device 10 to implement a cooking cycle. The controller 14 can also be operably coupled with a control panel or human-machine interface 28 for receiving user-selected inputs and communicating information to a user. The human-machine interface 28 can include operational controls such as dials, lights, switches, touch screen elements, and displays enabling a user to input commands, such as a cooking cycle, to the controller 14 and receive information. The user interface 28 can include one or more elements, which can be centralized or dispersed relative to each other. The controller 14 may also select the voltage level supplied by power supply 12.

The controller 14 can be provided with a memory and a central processing unit (CPU), and can be preferably embodied in a microcontroller. The memory can be used for storing control software that can be executed by the CPU in completing a cooking cycle. For example, the memory can store one or more pre-programmed cooking cycles that can be selected by a user and completed by the electromagnetic cooking device 10. The controller 14 can also receive input from one or more sensors. Non-limiting examples of sensors that can be communicably coupled with the controller 14 include peak level detectors known in the art of RF engineering for measuring RF power levels and temperature sensors for measuring the temperature of the enclosed cavity or one or more of the high-power amplifiers 18A-D.

Based on the user input provided by the human-machine interface 28 and data including the forward and backward (or reflected) power magnitudes coming from the multiple high-power amplifiers 18A-D (represented in FIG. 1 by the path from each of the high-power amplifiers 18A-D through the RF signal generator 16 to the controller 14), the controller 14 can determine the cooking strategy and calculate the settings for the RF signal generator 16. In this way, one of the main functions of the controller 14 is to actuate the electromagnetic cooking device 10 to instantiate the cooking cycle as initiated by the user. The RF signal generator 16 as described below then can generate multiple RF waveforms, that is, one for each high-power amplifier 18A-D based on the settings indicated by the controller 14.

The high-power amplifiers 18A-D, each coupled to one of the RF feeds 26A-D, each output a high power RF signal based on a low power RF signal provided by the RF signal generator 16. The low power RF signal input to each of the high-power amplifiers 18A-D can be amplified by transforming the direct current electrical power provided by the power supply 12 into a high power radio frequency signal. In one non-limiting example, each high-power amplifier 18A-D can be configured to output an RF signal ranging from 50 to 250 Watts. The maximum output wattage for each high-power amplifier can be more or less than 250 Watts depending upon the implementation. Each high-power amplifier 18A-D can include a dummy load to absorb excessive RF reflections.

The multiple RF feeds 26A-D transfer power from the multiple high-power RF amplifiers 18A-D to the enclosed cavity 20. The multiple RF feeds 26A-D can be coupled to the enclosed cavity 20 in spatially separated but fixed physical locations. The multiple RF feeds 26A-D can be implemented via waveguide structures designed for low power loss propagation of RF signals. In one non-limiting example, metallic, rectangular waveguides known in microwave engineering are capable of guiding RF power from a high-power amplifier 18A-D to the enclosed cavity 20 with a power attenuation of approximately 0.03 decibels per meter.

Additionally, each of the RF feeds 26A-D can include a sensing capability to measure the magnitude of the forward and the backward power levels or phase at the amplifier output. The measured backward power indicates a power level returned to the high-power amplifier 18A-D as a result of an impedance mismatch between the high-power amplifier 18A-D and the enclosed cavity 20. Besides providing feedback to the controller 14 and the RF signal generator 16 to implement, in part, a cooking strategy, the backward power level can indicate excess reflected power that can damage the high-power amplifier 18A-D.

Along with the determination of the backward power level at each of the high-power amplifiers 18A-D, temperature sensing at the high-power amplifier 18A-D, including at the dummy load, can provide the data necessary to determine if the backward power level has exceeded a predetermined threshold. If the threshold is exceeded, any of the controlling elements in the RF transmission chain including the power supply 12, controller 14, the RF signal generator 16, or the high-power amplifier 18A-D can determine that the high-power amplifier 18A-D can be switched to a lower power level or completely turned off. For example, each high-power amplifier 18A-D can switch itself off automatically if the backward power level or sensed temperature is too high for several milliseconds. Alternatively, the power supply 12 can cut the direct current power supplied to the high-power amplifier 18A-D.

The enclosed cavity 20 can selectively include subcavities 22A-B by insertion of an optional divider 24 therein. The enclosed cavity 20 can include, on at least one side, a shielded door to allow user access to the interior of the enclosed cavity 20 for placement and retrieval of food or the optional divider 24.

The transmitted bandwidth of each of the RF feeds 26A-D can include frequencies ranging from 2.4 GHz to 2.5 GHz. The RF feeds 26A-D can be configured to transmit other RF bands. For example, the bandwidth of frequencies between 2.4 GHz and 2.5 GHz is one of several bands that make up the industrial, scientific and medical (ISM) radio bands. The transmission of other RF bands is contemplated and can include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

Figure 2:
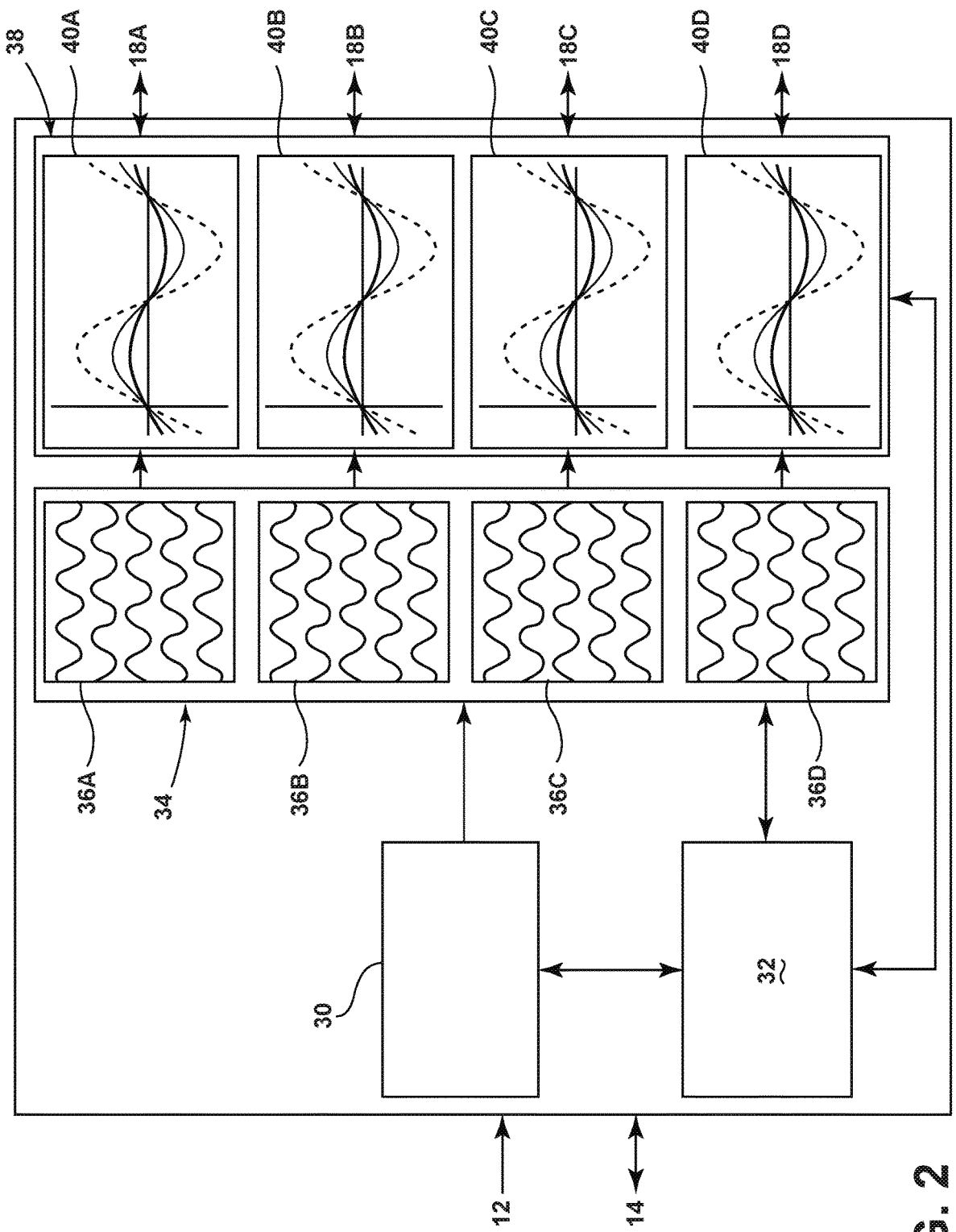
FIG. 2 is a block diagram of a radio frequency signal generator of FIG. 1.

Referring now to FIG. 2, a block diagram of the RF signal generator 16 is shown. The RF signal generator 16 includes a frequency generator 30, a phase generator 34 and an amplitude generator 38 sequentially coupled and all under the direction of an RF controller 32. In this way, the actual frequency, phases and amplitudes to be output from the RF signal generator 16 to the high-power amplifiers are programmable through the RF controller 32, preferably implemented as a digital control interface. The RF signal generator 16 can be physically separate from the cooking controller 14 or can be physically mounted onto or integrated into the controller 14. The RF signal generator 16 is preferably implemented as a bespoke integrated circuit.

As shown in FIG. 2 the RF signal generator 16 outputs four RF channels 40A-D that share a common but variable frequency (e.g. ranging from 2.4 GHz to 2.5 GHz), but are settable in phase and amplitude for each RF channel 40A-D. The configuration described herein is exemplary and should not be considered limiting. For example, the RF signal generator 16 can be configured to output more or less channels and can include the capability to output a unique variable frequency for each of the channels depending upon the implementation.

As previously described, the RF signal generator 16 can derive power from the power supply 12 and input one or more control signals from the controller 14. Additional inputs can include the forward and backward power levels determined by the high-power amplifiers 18A-D. Based on these inputs, the RF controller 32 can select a frequency and signal the frequency generator 30 to output a signal indicative of the selected frequency. As represented pictorially in the block representing the frequency generator 30 in FIG. 2, the selected frequency determines a sinusoidal signal whose frequency ranges across a set of discrete frequencies. In one non-limiting example, a selectable bandwidth ranging from 2.4 GHz to 2.5 GHz can be discretized at a resolution of 1 MHz allowing for 101 unique frequency selections.

After the frequency generator 30, the signal is divided per output channel and directed to the phase generator 34. Each channel can be assigned a distinct phase, that is, the initial angle of a sinusoidal function. As represented pictorially in the block representing the per channel phase generator 36A-D in FIG. 2, the selected phase of the RF signal for a channel can range across a set of discrete angles. In one non-limiting example, a selectable phase (wrapped across half a cycle of oscillation or 180 degrees) can be discretized at a resolution of 10 degrees allowing for 19 unique phase selections per channel.

Subsequent to the phase generator 34, the RF signal per channel can be directed to the amplitude generator 38. The RF controller 32 can assign each channel (shown in FIG. 2 with a common frequency and distinct phase) to output a distinct amplitude in the channel 40A-D. As represented pictorially in the block representing the per channel amplitude generator in FIG. 2, the selected amplitude of the RF signal can range across a set of discrete amplitudes (or power levels). In one non-limiting example, a selectable amplitude can be discretized at a resolution of 0.5 decibels across a range of 0 to 23 decibels allowing for 47 unique amplitude selections per channel.

The amplitude of each channel 40A-D can be controlled by one of several methods depending upon the implementation. For example, control of the supply voltage of the amplitude generator 38 for each channel can result in an output amplitude for each channel 40A-D from the RF signal generator 16 that is directly proportional to the desired RF signal output for the respective high-power amplifier 18A-D. Alternatively, the per channel output can be encoded as a pulse-width modulated signal where the amplitude level is encoded by the duty cycle of the pulse-width modulated signal. Yet another alternative is to coordinate the per channel output of the power supply 12 to vary the supply voltage supplied to each of the high-power amplifiers 18A-D to control the final amplitude of the RF signal transmitted to the enclosed cavity 20.

As described above, the electromagnetic cooking device 10 can deliver a controlled amount of power at multiple RF feeds 26A-D into the enclosed cavity 20. Further, by maintaining control of the amplitude, frequency and phase of the power delivered from each RF feed 26A-D, the electromagnetic cooking device 10 can coherently control the power delivered into the enclosed cavity 20. Coherent RF sources deliver power in a controlled manner to exploit the interference properties of electromagnetic waves. That is, over a defined area of space and duration of time, coherent RF sources can produce stationary interference patterns such that the electric field is distributed in an additive manner. Consequently, interference patterns can add to create an electromagnetic field distribution that is greater in amplitude than any of the RF sources (i.e. constructive interference) or less than any of the RF sources (i.e. destructive interference).

The coordination of the RF sources and characterization of the operating environment (i.e. the enclosed cavity and the contents within) can enable coherent control of the electromagnetic cooking and maximize the coupling of RF power with an object in the enclosed cavity 20. Efficient transmission into the operating environment can require calibration of the RF generating procedure. As described above, in an electromagnetic heating system, the power level can be controlled by many components including the voltage output from the power supply 12, the gain on stages of variable gain amplifiers including both the high-power amplifiers 18A-D and the amplitude generator 38, the tuning frequency of the frequency generator 30, etc. Other factors that affect the output power level include the age of the components, inter-component interaction and component temperature.

Figure 3:
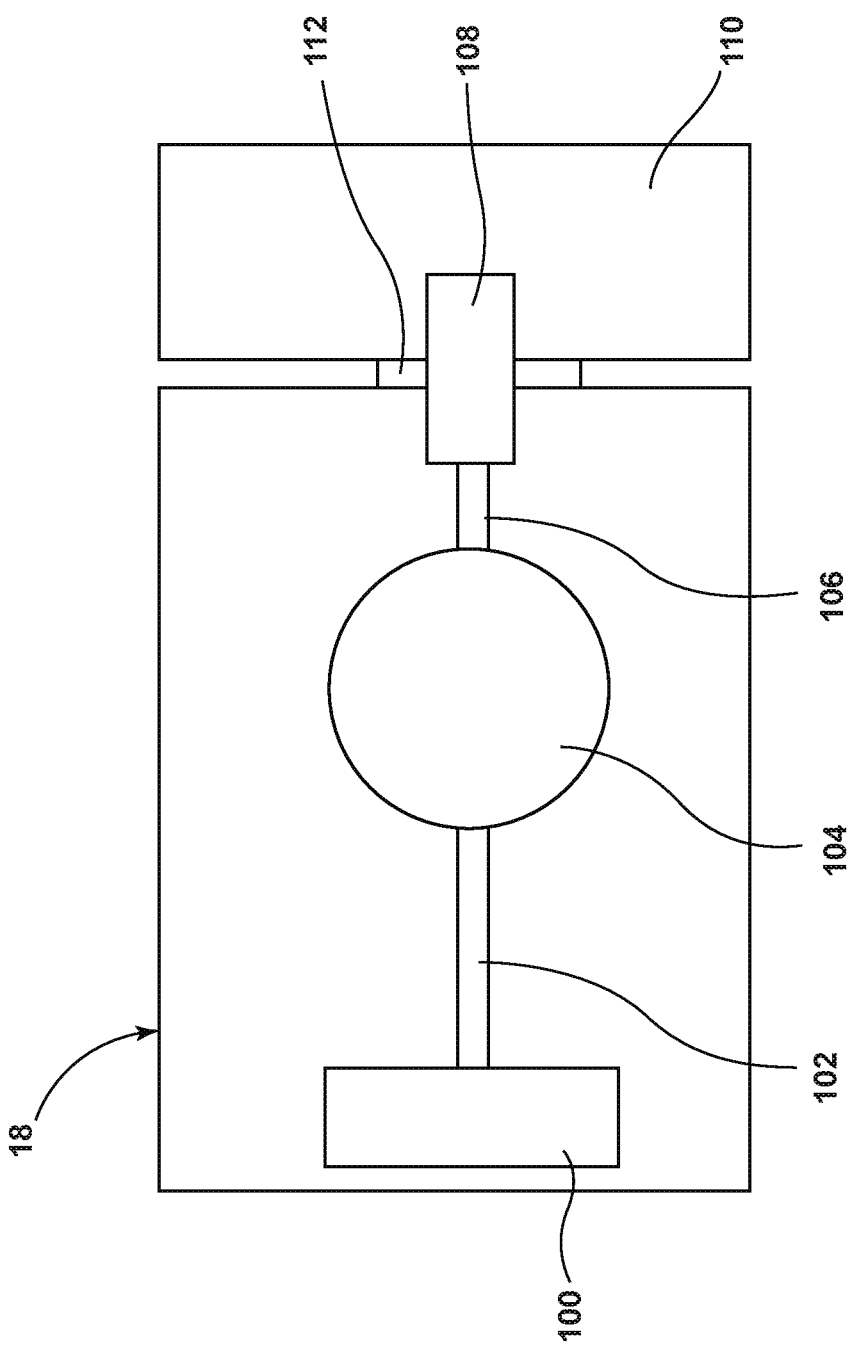
FIG. 3 is a schematic diagram illustrating a high-power radio frequency amplifier coupled to a waveguide in accordance with various aspects described herein.

Referring now to FIG. 3, a schematic diagram illustrating a high-power amplifier 18 coupled to a waveguide 110 in accordance with various aspects described herein is shown. The high-power amplifier 18 includes one or more amplification stages 100 coupled via a guiding structure 102 to a circulator 104. The circulator 104 is coupled by a guiding structure 106 to a waveguide exciter 108. The high-power amplifier 18 is electrically coupled to the waveguide 110 by the waveguide exciter 108 and mechanically coupled by an electromagnetic gasket 112.

The high-power amplifier 18 is configured such that a number of amplification stages 100 are interconnected to amplify a radio frequency signal from the amplifier input to the amplifier output. The amplification stages 100 include one or more transistors configured to convert a small change in input voltage to produce a large change in output voltage. Depending upon the configuration of the circuit, the amplification stages 100 can produce a current gain, a voltage gain or both.

The output of the amplification stages 100 is coupled to the circulator 104 via a guiding structure 102. The guiding structure 102 can be any electrical connector capable of carrying high-power radio frequency signal including but not limited to a microstrip printed on a dielectric substrate of a printed circuit board. The circulator 104 is a passive multi-port component that transmits radio frequency signals from one port to the next where a port is a point on the circulator 104 for coupling a radio frequency signal from one component to another. In the high-power amplifier 18, the circulator 104 acts as a protective device to isolate the amplification stages 100 from deleterious effects that can occur when a mismatched load reflects power.

The circulator 104 is coupled to the waveguide exciter 108 via the guiding structure 106. The high-power amplifier 18 is terminated at its output by the waveguide exciter 108. The waveguide exciter 108 converts electromagnetic energy from a first mode suitable for transmission within the high-power amplifier 18 to a second mode suitable for transmission within the waveguide 110. In this way, the waveguide 110 acts as an RF feed 26A-D to convey the amplified electromagnetic signal from the high-power amplifier to the microwave cavity.

The electromagnetic gasket 112 provides a secure connection between the high-power amplifier 18 and the waveguide 110 and surrounds the portion of the waveguide exciter 108 positioned between the high-power amplifier 18 and the waveguide 110. The electromagnetic gasket 112 can be formed of one or more materials useful for securing the connection between the high-power amplifier 18 and the waveguide 110 and providing electromagnetic shielding at radio frequencies. Such materials can include, but are not limited to, silicone-based constituents filled with conductive particles such as silver or nickel.

The provision of the waveguide exciter 108 that terminates the output of the high-power amplifier 18 reduces the electromagnetic losses typically incurred at the junction of microwave devices coupled via conventional connectors. That is, conventional microwave devices are interconnected via coaxial connectors (e.g. BNC or N-type connectors) that incur RF losses due to the additional path lengths for the connectors as well as the losses at the coupling of the coaxial connectors. The electromagnetic gasket 112 augments the efficiency of the waveguide exciter 108 by shielding the waveguide exciter 108 as well as providing the mechanical support of the coupling between the high-power amplifier 18 and the waveguide 110.

Figure 4:
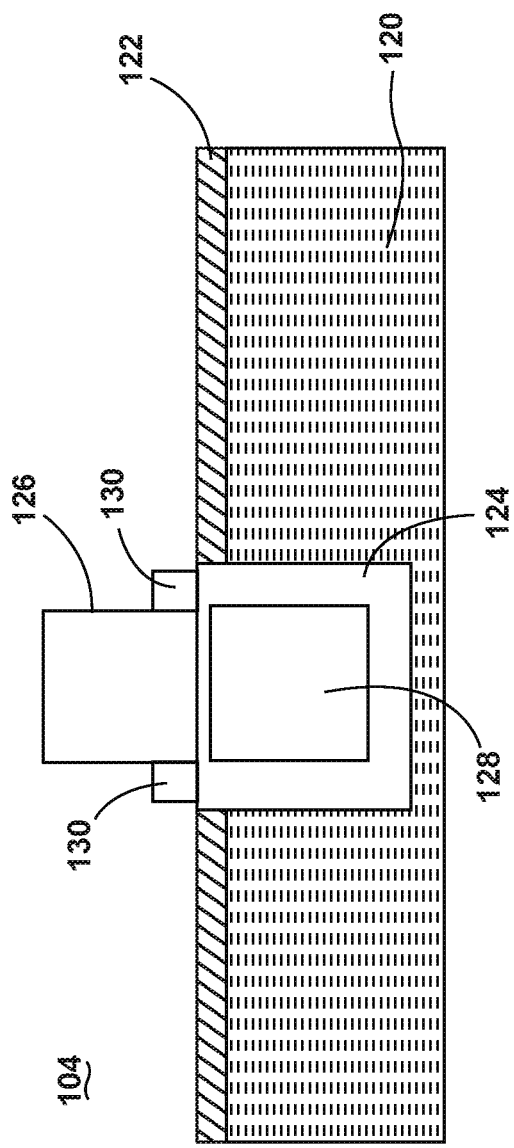
FIG. 4 is a cross-sectional diagram illustrating an integrated circulator for use in a high-power radio frequency amplifier in accordance with various aspects described herein.

Referring now to FIG. 4, a cross-sectional side view illustrating the circulator 104 in accordance with various aspects described herein is shown. As described above, the circulator 104 is coupled to the output of the amplification stages via the guiding structure 102. The circulator 104 includes a laminate 122 mounted to a metal base plate 120.

Two ferrite magnets 126, 128 in axial alignment perpendicular to the laminate 122 are secured to the laminate 122 by clips 130. The ferrite magnets 126, 128 can be any shape suitable for the circulator design, including, but not limited to a disk.

The guiding structure 102 can include a microstrip that is printed on a laminate 122. The laminate 122 is a dielectric substrate that can include any material suitable for the provision of insulating layers of a printed circuit board including, but not limited to, FR-2 material or FR-4 material. The laminate 122 is positioned on the metal base plate 120 that provides mechanical support to the circulator 104. Additionally, the metal base plate 120 acts as a thermal dissipating mass and to spread heat generated by the circulator 104. The metal base plate 120 includes a pocket 124 to house the lower ferrite magnet 128.

During the manufacturing of the circulator 104, the lower ferrite magnet 128 is placed in the pocket 124 of the metal base plate 120. The laminate 122 and microstrip guiding structure are applied to the metal base plate 120. The upper ferrite magnet 126 is placed above lower ferrite magnet 128 and secured to the laminate 122 by clips 130.

Figure 5:
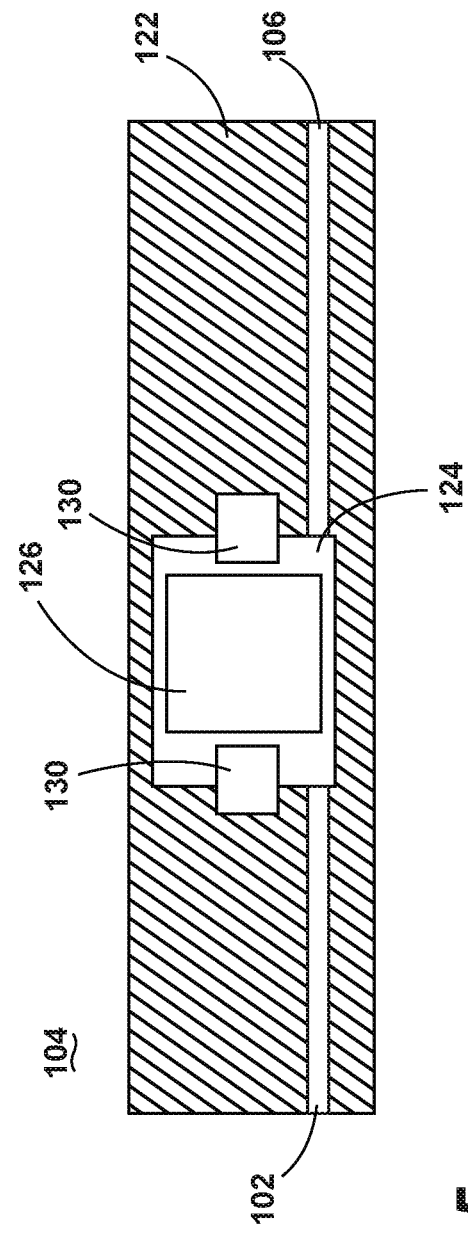
FIG. 5 is a top-view diagram illustrating the integrated circulator of FIG. 4.

FIG. 5 is a top-view diagram illustrating the integrated circulator of FIG. 4. As described, the circulator 104 includes, as part of its magnetic circuit, the laminate 122 of a printed circuit board as well as the microstrip guiding structure 102 coupled to the output of the amplification stages (cf. element 100 in FIG. 3). In this way, the circulator 104 does not include input or output pins that require a soldered connection during the manufacturing process. Conventional solder joints can expose the high-power amplifier to reliability issues because the soldering process can result in cold-spots or bad couplings. Therefore, the circulator 104 is not a conventional discrete component soldered in the high-power amplifier. Instead the circulator 104 is directly integrated as a component of the high-power amplifier.

For the output power level at the end of the amplification stages 100 to hit a desired set-point level, the RF signal generator (cf. element 16 in FIG. 1) can rely on feedback in the form of signals indicative of the forward and backward power levels or the relative phases of the radio frequency signals conveyed to the enclosed cavity (cf. element 20 in FIG. 1). Therefore, in addition to the amplifying components for outputting a radio frequency signal that is amplified in power with respect to an input radio frequency signal, conventional high-power amplifiers can include a measuring component that outputs a signal indicative of the radio frequency power transmitted and received by the amplifying component. However, by integrating such a measurement component within the high-power amplifier, the output stage of a high-power amplifier can incur electrical losses that can reduce the power and fidelity of the radio frequency signal output to the radio frequency feed (cf. elements 26A-D in FIG. 1) such as a waveguide.

Figure 6:
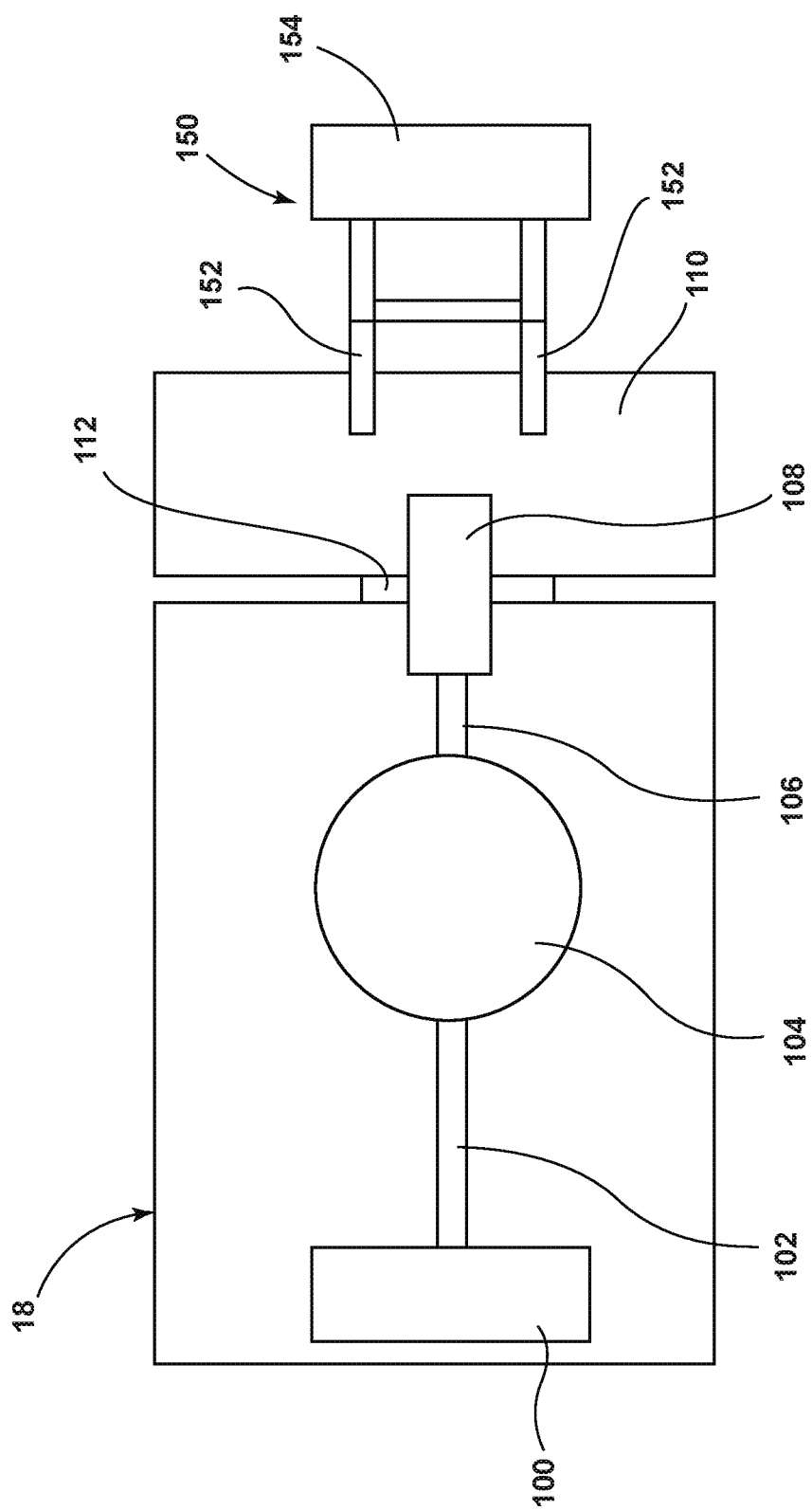
FIG. 6 is a schematic diagram illustrating a high-power radio frequency amplifier coupled to a waveguide with an integrated measurement system in accordance with various aspects described herein.

Referring now to FIG. 6, schematic diagram illustrating a high-power amplifier 18 coupled to a waveguide 110 with an integrated measurement system 150 in accordance with various aspects described herein is shown. The integrated measurement system 150 includes probe antennas 152 coupled to electronic components 154. The probe antennas 152 include portions located within the waveguide 110 that convert radio frequency electromagnetic waves within the waveguide 110 into an analog electric power signal. The probe antennas 152 can be any type of antenna useful for measuring radio frequency electromagnetic waves within a waveguide, including but not limited to, dipole antennas.

The electronic components 154 are coupled to the probe antennas 152 and can include an analog-to-digital convertor (ADC) such that the output signal is digital and readily input to a device such as the RF signal generator (cf. element 16 in FIG. 1), controller (cf. element 14 in FIG. 1) or the RF controller (cf. element 32 in FIG. 1). The electronic components 154 can be any component useful for the measurement of radio frequency signals including, but not limited to, radio frequency log power detectors that provide a direct current output voltage that is log-linear with respect to the detected radio frequency power level within the waveguide 110.

Figure 7:
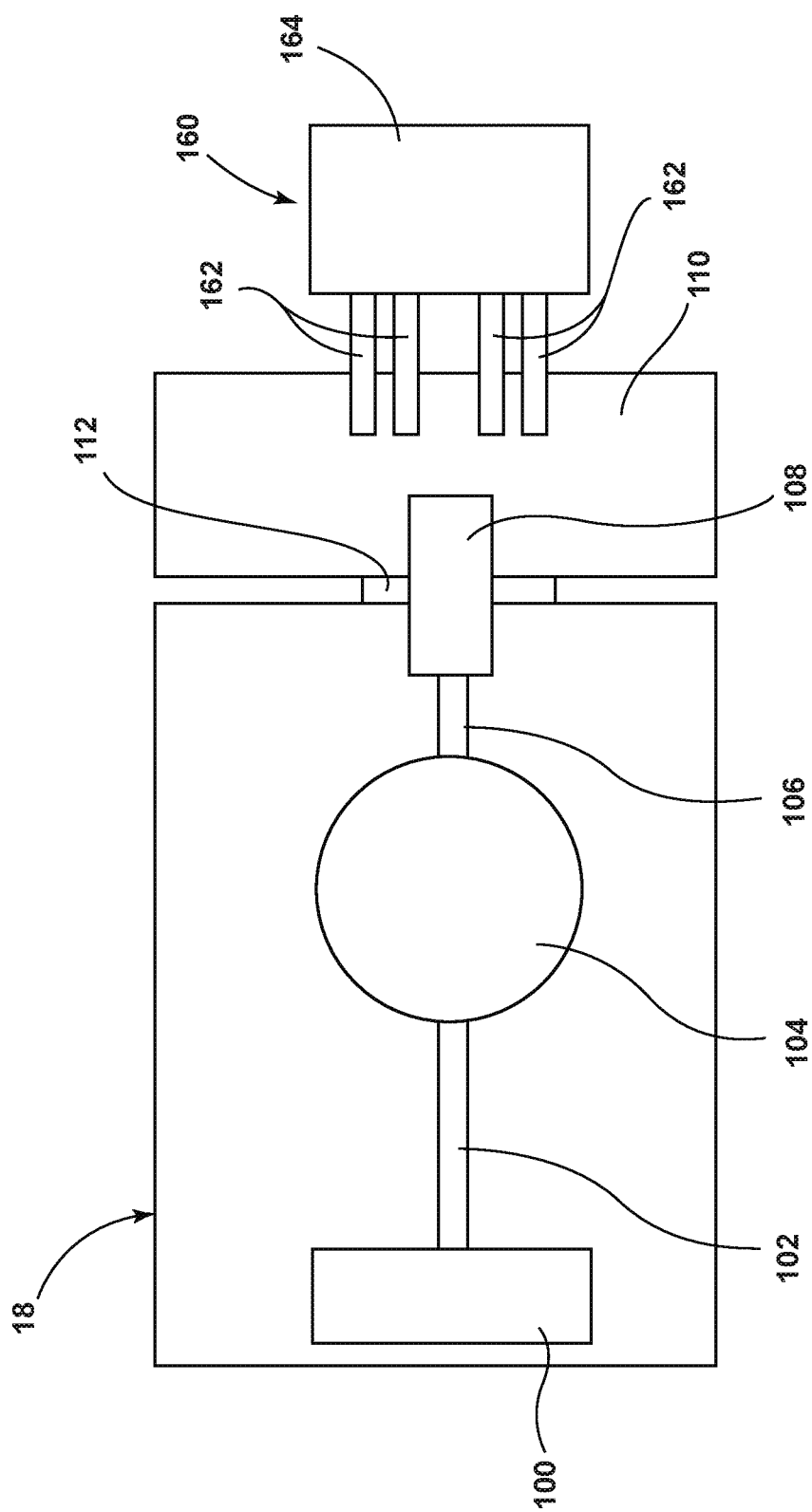
FIG. 7 is a schematic diagram illustrating a high-power radio frequency amplifier coupled to a waveguide with an integrated measurement system including a reflectometer in accordance with various aspects described herein.

The measurement system can include additional components useful for further characterizing the radio frequency transmissions conveyed through the waveguide 110. Referring now to FIG. 7, a schematic diagram illustrating a high-power radio frequency amplifier 18 coupled to a waveguide 110 with an integrated measurement system 160 that includes a reflectometer 164 in accordance with various aspects described herein is shown. The integrated measurement system 160 includes probe antennas 162 coupled to a reflectometer 164. The probe antennas 162 include portions located within the waveguide 110 that convert radio frequency electromagnetic waves within the waveguide 110 into an analog electric power signal. The probe antennas 162 can be any type of antenna useful for measuring radio frequency electromagnetic waves within a waveguide, including but not limited to, dipole antennas.

The reflectometer 164 can include any components useful for measuring the phase of a radio frequency signal including, but not limited to, a directional coupler containing matched calibrated detectors or a pair of single-detector couplers oriented so as to measure the electrical power flowing in both directions within the waveguide 110. In this way, the integrated measurement system 160 can characterize the radio frequency transmissions according to power and phase and can be used to form a networked description as embodied in the scattering matrix or S-parameters. In one non-limiting implementation, the reflectometer 164 is a six port reflectometer configured to measure the phase of the forward and backward radio frequency radiation within the waveguide.

The reflectometer 164 is coupled to the probe antennas 162 and can include an analog-to-digital convertor (ADC) such that the output signal indicative of the phase or power of the radio frequency electromagnetic wave within the waveguide 110 or scattering matrix is digital and readily input to a device such as the RF signal generator (cf. element 16 in FIG. 1), controller (cf. element 14 in FIG. 1) or the RF controller (cf. element 32 in FIG. 1).

By characterizing the conveyed radio frequency transmissions according to power and phase measurements or scattering matrix, the electromagnetic cooking device (cf. element 10 in FIG. 1) with solid-state radio frequency sources can precisely excite an enclosed cavity (cf. element 20 in FIG. 1) by controlling the coupling factor of the resonant modes or standing waves that determine the heating pattern therein. That is, a solid-state electromagnetic cooking device can energize desired heating patterns by coupling specific resonant modes to the microwave cavity via the actuation of the radio frequency sources where the heating pattern is determined by the modulus of the resonant mode. The resonant modes are a function of the cavity dimension, food load type, food load placement and excitation condition of the multiple coherent radio frequency sources (e.g. the operating frequency and phase shift between the sources, etc.). The electromagnetic cooking device can be configured to control the solid-state radio frequency sources to select the coupling factor of the resonant modes to energize a specific heating pattern or a sequence of heating patterns over time. The heating patterns related to specific resonant modes can determine the evenness or unevenness of the cooking process. However, because the resonant modes are a function of the food load type and placement, the cavity size and excitation condition, it is not possible to have an a priori knowledge of the resonant modes and their critical frequencies.

Figure 8:
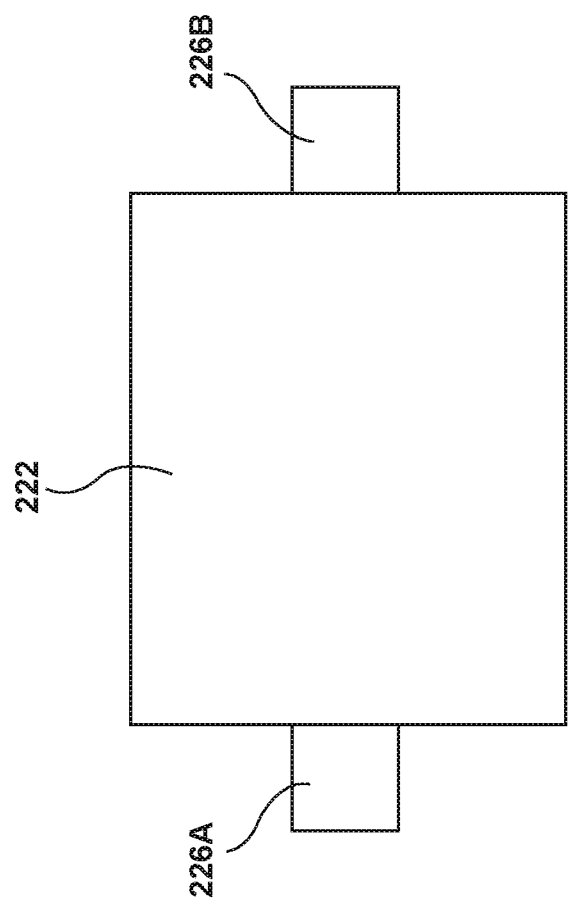
FIG. 8 is a schematic diagram illustrating a resonant cavity coupled to two radio frequency waveguides in accordance with various aspects described herein.

Therefore, the electromagnetic cooking device can be configured to determine the resonant modes within an enclosed cavity in-situ. Referring now to FIG. 8, a schematic diagram illustrating a resonant cavity 222 coupled to two RF feeds 226A,B embodied as waveguides in accordance with various aspects described herein is shown. The RF feeds 226A,B transfer power from their respective high-power amplifiers (cf. elements 18A,B in FIG. 1) to the enclosed cavity 222. The RF feeds 226A,B can be coupled to the enclosed cavity 222 in spatially separated but fixed physical locations. The RF feeds 226A,B can convey RF transmissions to the enclosed cavity 222 at a selected frequency and phase where the phase shift or difference between the RF transmissions directly relates to the class of symmetry of the excited resonant mode. For example activating the RF sources in an in-phase relationship (i.e. phase shift=0°) activates modes of even symmetry while activating the sources in an antiphase relationship (i.e. phase shift=180°) activates modes of odd symmetry. The symmetries determine the heating patterns in the oven as will be described below. Although the example is given that activating the RF sources in an in-phase relationship (i.e. phase shift=0°) activates modes of even symmetry while activating the sources in an antiphase relationship (i.e. phase shift=180° activates modes of odd symmetry, other phase shifts may be employed depending on the hardware architecture of the system.

In operation, the electromagnetic cooking device determines the set of symmetries (e.g. even or odd) for the resonant modes to be excited within the cavity 222. The electromagnetic cooking device is configured to excite the cavity 222 for a set of operating frequencies and store the efficiency measured for each frequency. The efficiency is determined by the useful power output divided by the total electrical power consumed which can be measured according to the ratio of forward power less the backward power to forward power as in:

$$\eta = \frac{\Sigma P_{forward} - \Sigma P_{backward}}{\Sigma P_{forward}}$$

The electromagnetic cooking device is configured to store the efficiency map in memory for the excited classes of symmetries.

Figure 9:
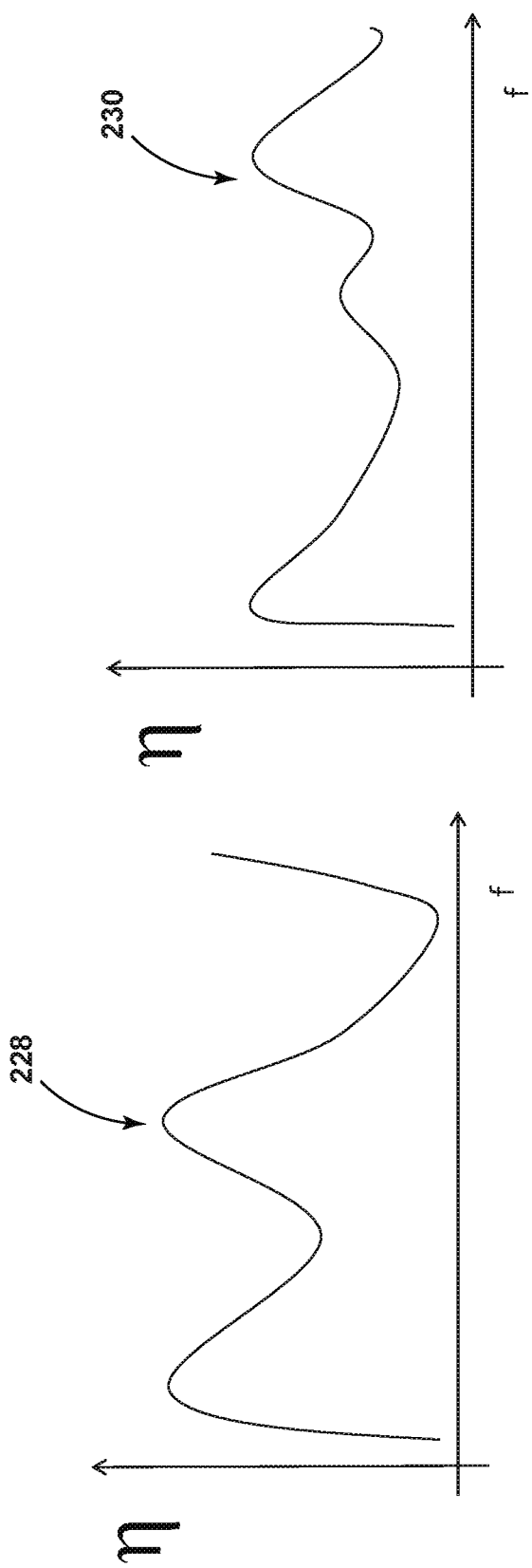
FIG. 9 is a graphical diagram illustrating efficiency versus frequency for in-phase and antiphase excitations of the resonant cavity of FIG. 8.

Referring now to FIG. 9, a graphical diagram illustrating efficiency versus frequency for in-phase excitations 228 and antiphase excitations 230 of the resonant cavity is shown. In this non-limiting illustrative example, the electromagnetic cooking device is configured to conduct two sets of excitations for each operating frequency and obtain two efficiency measurements.

Figure 10:
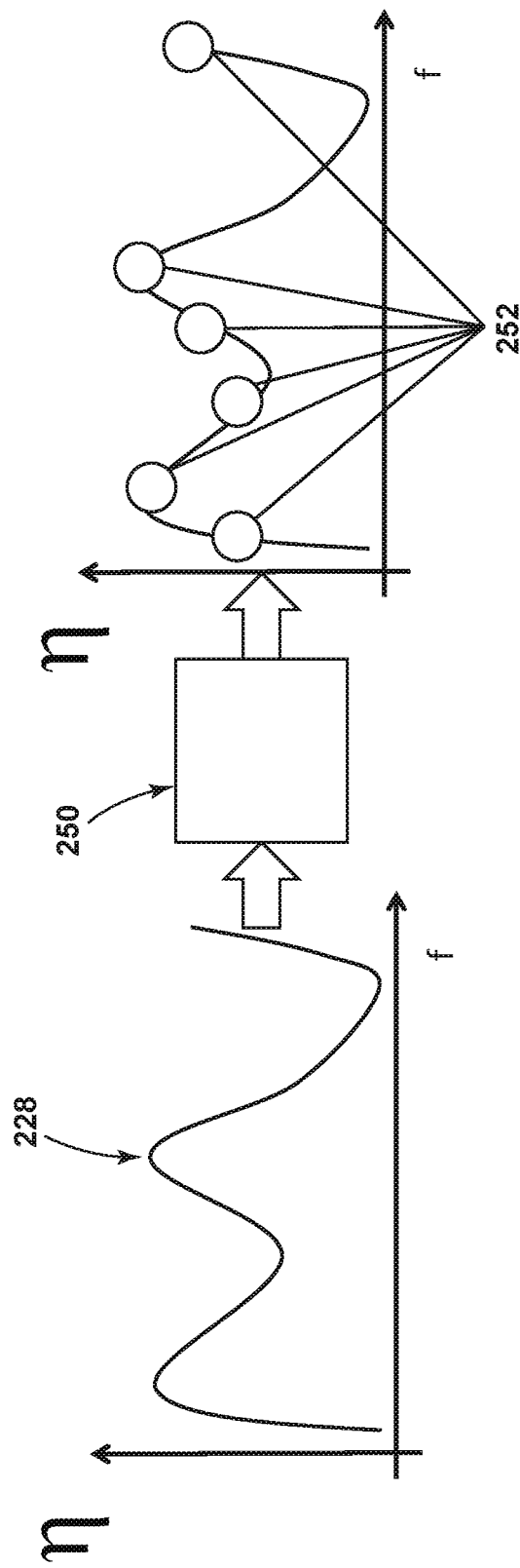
FIG. 10 is a diagram illustrating features of a method of analysis to determine the resonant modes of the cavity in accordance with various aspects described herein.

Referring now to FIG. 10, a diagram illustrating features of a method of analysis to determine the resonant modes of the cavity in accordance with various aspects described herein is shown. The electromagnetic cooking device can analyze the recorded map of efficiency (shown for the in-phase excitation 228) by modeling the response as a passband RLC circuit in order to recognize the critical frequencies of the poles (i.e. the resonant frequencies of the resonant modes) that have been excited for the specific class of symmetry. For this purpose, a processor 250 as a physical or logical subcomponent of the controller (cf. element 14 in FIG. 1) or the RF controller (cf. element 32 in FIG. 2) can be configured to identify local maxima of the efficiency function. The processor 250 can implement any algorithm useful for determining the critical frequencies of the poles of the efficiency map including, but not limited to vector fitting, magnitude vector fitting, etc. In this way, the processor 250 can determine a list of resonant frequencies 252 for each symmetry plane.

Additionally, the processor 250 can determine a quality factor (Q-factor) based on the relative bandwidth of each determined pole. The processor 250 can determine the presence of foodstuff located within the cavity based on the estimate of the Q-factor. For example, if the processor 250 determines that a selected resonant mode has a low Q-factor such as at or below seven, the processor 250 can determine that the portions of the enclosed cavity where the excited mode has a local or global maximum contain foodstuff. Similarly, if the processor 250 determines that a selected resonant mode has a high Q-factor such as greater than 1000, the processor can determine that the portions of the enclosed cavity where the excited mode has a local or global maximum do not have foodstuff. The processor 250 can classify the type of foodstuff located within the cavity based on the estimate of the Q-factor. For example, frozen food has a Q-factor of about 300, water has a Q-factor of about 7 and metal objects has a Q-factor of about 1000. For each determined pole, the processor 250 can associate a resonant frequency used to excite the mode and a Q-factor for determining the type of foodstuff that will be heated by the mode.

Figure 11:
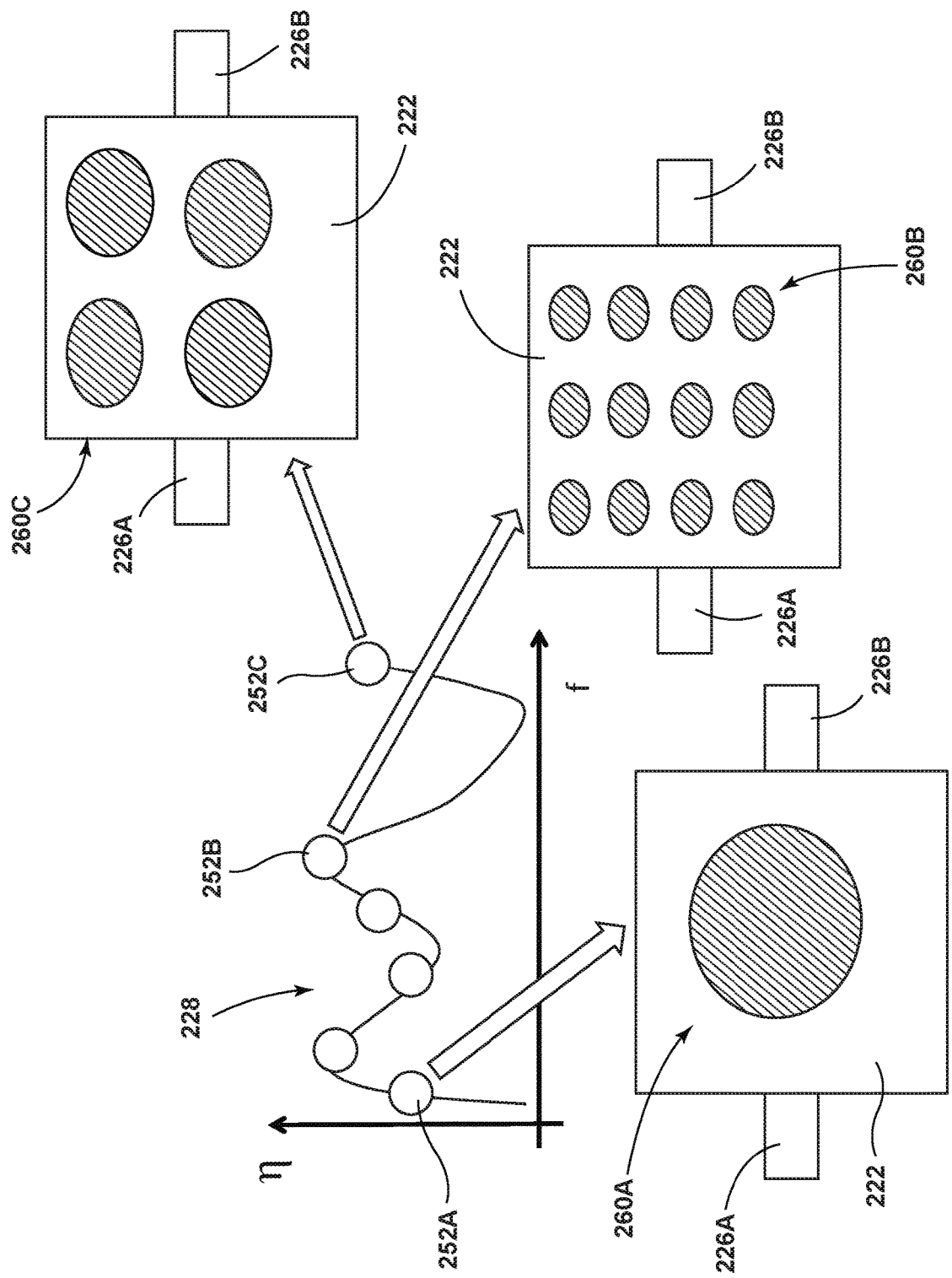
FIG. 11 is a diagram illustrating features of a method to characterize the resonant modes of the cavity in accordance with various aspects described herein.

Referring now to FIG. 11, a diagram illustrating features of a method to characterize the resonant modes of the cavity in accordance with various aspects described herein is shown. Building on the previously described example of an in-phase excitation 228 of the radio frequency feeds 226A,B where a processor of the electromagnetic cooking device determines a set of poles 252 indicative of the resonant modes excitable in the cavity 222, the determined poles 252A-C each correspond to a heating pattern 260A-C within the cavity 222. Recall that the heating pattern is determined by the modulus of the resonant mode. Each heating pattern 260A-C will have a spatial pattern with contours indicative of uniform heating. While depicted in FIG. 11 with a binary set of contours, the actual heating patterns will include many contours indicative of a continuum of heating levels. For ease of understanding, the single contour level indicates the hottest areas of the heating pattern and demonstrates the even and odd symmetries of the resonant modes.

Figure 12B:
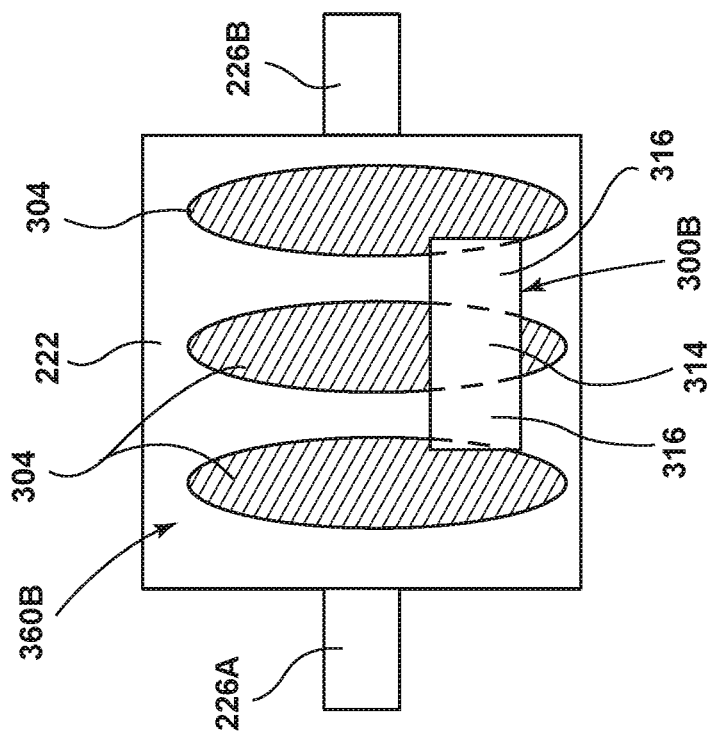
FIGS. 12A and 12B are schematic diagrams illustrating features of a method to locate and classify foodstuff positioned within a resonant cavity in accordance with various aspects described herein.
Figure 12A:
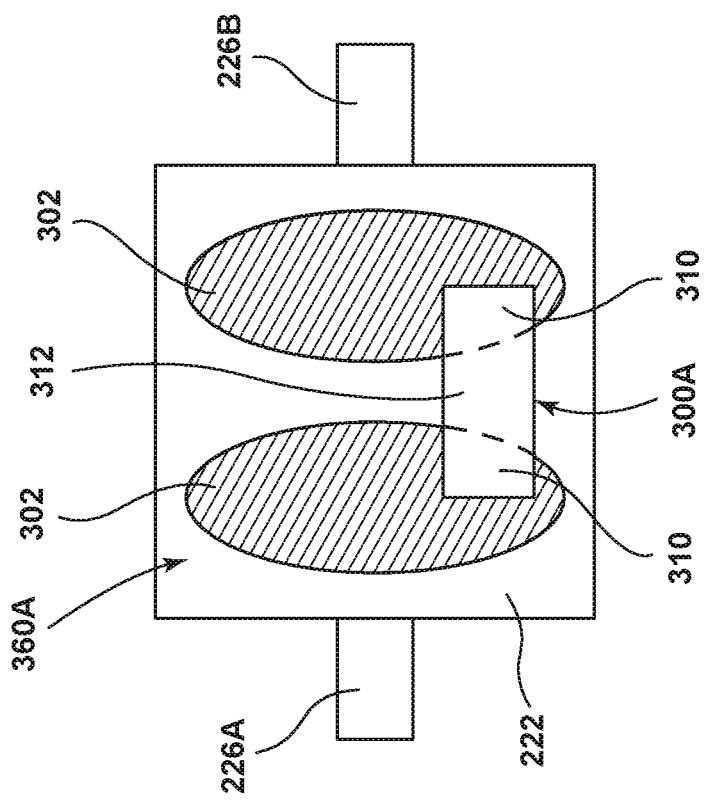

Referring now to FIGS. 12A and 12B, a schematic diagram illustrating features of a method to locate and classify foodstuff 300A,B positioned within a resonant cavity 222 in accordance with various aspects described herein is shown. Initiating an antiphase phase excitation (shown in FIG. 12A), the electromagnetic cooking device can generate a heating pattern 360A in the cavity 222 with an even symmetry where the maximum heating contours 302 do not occur in the center of the cavity 222. Because a large portion 312 of the foodstuff 300A is lying within a minimum of the heating pattern 360A and only a small portion 310 of the foodstuff 300A is lying within a maximum of the heating pattern 360A, the cavity reflections are more significant the electromagnetic response from the foodstuff 300A leading to a relatively low efficiency. In contrast, because a large portion 314 of the foodstuff 300B is lying within a maximum of the heating pattern 360B and only a small portion 316 of the foodstuff 300B is lying within a minimum of the heating pattern 360B for an in-phase excitation (FIG. 12B), the cavity reflections are minimized and the efficiency is higher than the efficiency determined during the even symmetry excitation. Therefore, the electromagnetic cooking device can determine if foodstuff is located in the center of the cavity 222 by comparing the efficiencies between the efficiencies between an in-phase excitation and an antiphase excitation. To wit, a higher efficiency with in-phase excitation indicates that foodstuff is not located in the center of the cavity 222 and a higher efficiency with an antiphase excitation indicates the foodstuff is located at the center of the cavity 222. In this way, the electromagnetic cooking device can be configured to determine the presence of foodstuff positioned in the center of the microwave cavity 222 based on the efficiency of the activated resonant modes of even symmetry or determine the presence of foodstuff positioned remotely from the center of the microwave cavity 222 based on the efficiency of the activated resonant modes of odd symmetry.

Additionally, the processor can be configured to further analyze the Q-factors according to the efficiency and symmetry of the resonant modes to detect and locate more than one type of foodstuff in the cavity 222. The processor can be configured to average the Q-factors for a subset of the identified resonant modes to classify a portion 310, 314 of a foodstuff 300A, 300B according to its position within the microwave cavity 222. For example, the processor can average the Q-factors of the even symmetry modes to determine the type of foodstuff located in a portion 310 of the foodstuff 300A that intersects with the maximum heating contours 302 of the even symmetry heating patterns 360A. Similarly, the processor can average the Q-factors of the odd symmetry modes to determine the type of foodstuff located in a portion 314 of the foodstuff 300B that intersects with the maximum heating contours 304 of the odd symmetry heating patterns 360B.

Cooking applications usually require power levels in the range of hundreds of watts, as a very common power budget for magnetron heating sources in microwave ovens is in the range of 800-1000 W. Nonetheless, not all applications require such a high power level. For example, an application may require a lower power level as low as 80 W to ensure homogeneous heating and/or a controlled process. Moreover, some cooking processes are destroyed or harmed if too high power levels are used (i.e. the quality of the cooking process diminishes as power level increases). One example of such a process is melting of butter or chocolate. Another example is raising bread, where a temperature suitable for yeast growth must not be exceeded for a certain amount of time.

The use of solid-state sources allows a precise excitation of the enclosed cavity 20, 222, i.e. precise coupling to certain resonant modes to which specific heating patterns correspond. As noted above, the resonant modes are a function of the cavity dimension, food load type and displacement and excitation condition (i.e. operating frequency and phase shift between sources in case of use of multiple coherent sources). On the other hand, with traditional non-coherent magnetron sources, such coupling is less controllable since the operating frequency is fixed and the phase shift relationship does not exist. In order to leverage the increased controllability of solid-state sources it is desirable to control the coupling factor of the resonant modes in order to realize a specific heating pattern and/or a specific sequence over time of heating patterns related to specific resonant modes in order to achieve increased evenness and/or controlled unevenness. Such controlled unevenness may be used for a zone cooking application in which the electric field, namely the source of heating pattern, is unbalanced to the left or to another portion of the enclosed cavity 20, 222. Because the resonant modes are a function of the food load and its displacement, cavity size, and excitation condition, it is not possible to have an a priori knowledge of the resonant modes and their critical frequencies. It is therefore not possible to determine which resonant modes are excited for a specific set of cavity size/food load type and displacement and excitation condition without having all this information, for example, receiving user input at the user interface 28 or having additional sensors like cameras to detect the enclosed cavity 20 loading conditions and all its characteristics.

Figure 13:
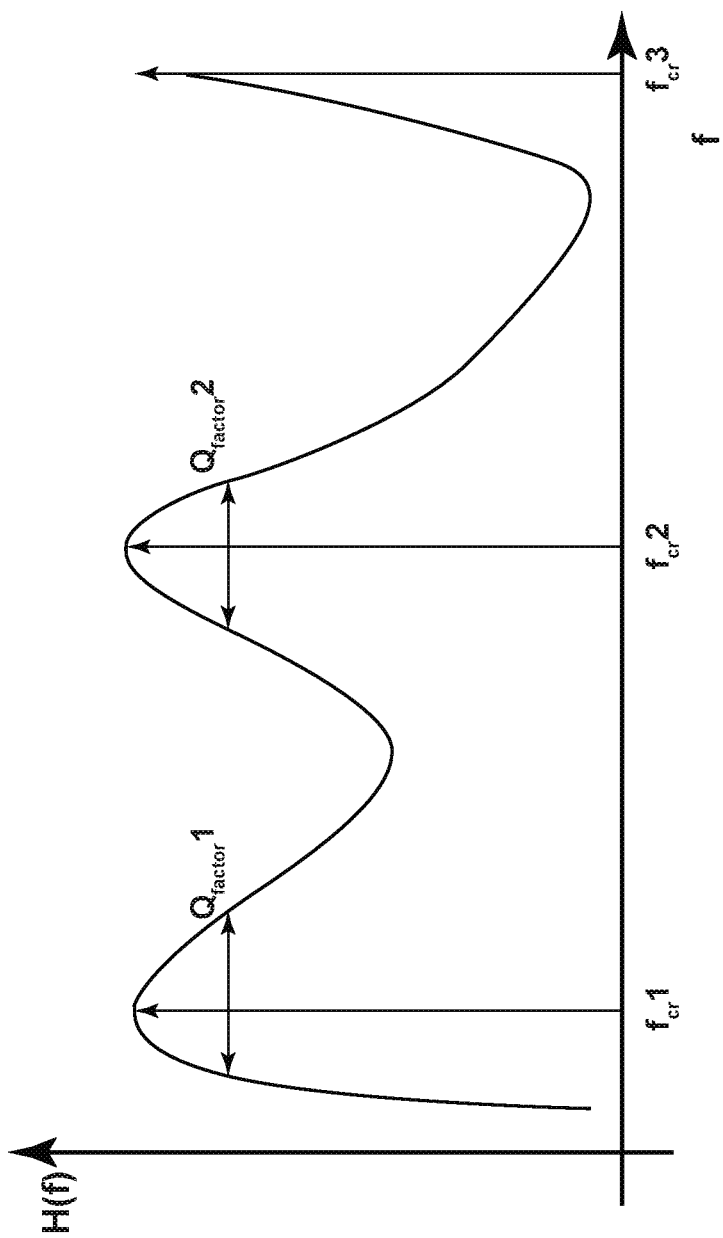
FIG. 13 is a graphical diagram illustrating efficiency versus frequency for in-phase excitations of the resonant cavity of FIG. 8 showing the Q factors.

The embodiments described here relate to a method to use preclassified resonant modes to be activated (i.e. to which the sources transfer energy) into the enclosed cavity 20, 222 to obtain even or uneven heating of a food load. This technique may be referred to as spectromodal control as it is founded on the connection between absorption spectrum and resonant modes. The theory allows homogeneous heating patterns, center-dominating heating patterns, or unbalanced patterns. The theory stems from the observation that in an enclosed cavity 20, 222, the coupling between sources and resonant modes is a function of the operating frequency, since such resonant modes exist only at specific discrete frequencies (the resonant frequency, critical frequency or so-called eigenvalues of the modes). Microwave cavities can be represented as circuits finding an equivalent circuit that shares the same frequency response. In view of this circuital (filter-like) representation, the resonant modes may be represented as pass-band filters centered at their critical frequencies and with a band inversely proportional to their Q-factor. The Q-factor is related to the losses (dielectric losses that occur into the load as well as metallic losses coming from surface currents arising into metals). The passband representation of the enclosed cavity 20, 222 is depicted in FIG. 13. The coupling of such resonant modes with respect to the operating frequency can be thought of as a coupling factor related to the frequency/time factor of the excitations.

The coupling of the sources with the modes of the resonant enclosed cavity 20, 222 is a function of the excitations displacement and phase relationship in between them (when multiple coherent sources are used) with respect to the enclosed cavity 20, 222. This second coupling factor can be thought as related to the 'space' factor of the excitations. The applied phase shift directly relates to the class of symmetry of the transferred resonant mode. Take as example the enclosed cavity 222 depicted in FIG. 8. Activating the sources in phase relationship activates modes of even symmetry while activating the sources in antiphase relationship activates modes of odd symmetry. This behavior is depicted in FIGS. 12A and 12B where FIG. 12A represents the antiphase relationship and FIG. 12B represents the in-phase relationship. The explanation can be found considering the phase relationship between the two planes on which the two sources lay, i.e. the natural phase shift that the two aforementioned classes of symmetries impose on the enclosed cavity 222. For instance, every resonant mode (that composes the so called free-response of the enclosed cavity 20) imposes specific boundary conditions on cavity walls, namely where the sources are placed. If the enclosed cavity 20, 222 excitation is obtained through waveguides, a very common case for microwave ovens 10, the waveguides shall be placed in the location and with a phase shift in between them that matches the resonant mode that they are designed to excite. In this case, the enclosed cavity 20, 222, when excited (the so called forced-response), will present an electromagnetic field configuration corresponding to that which the resonant mode to which the excitation is targeted would have. Using such considerations, it is possible to get a map of critical frequencies and class of symmetries (spectromodal identification). Moreover, it is possible to measure or estimate the coupled efficiency for each identified resonant mode.

Figure 14:
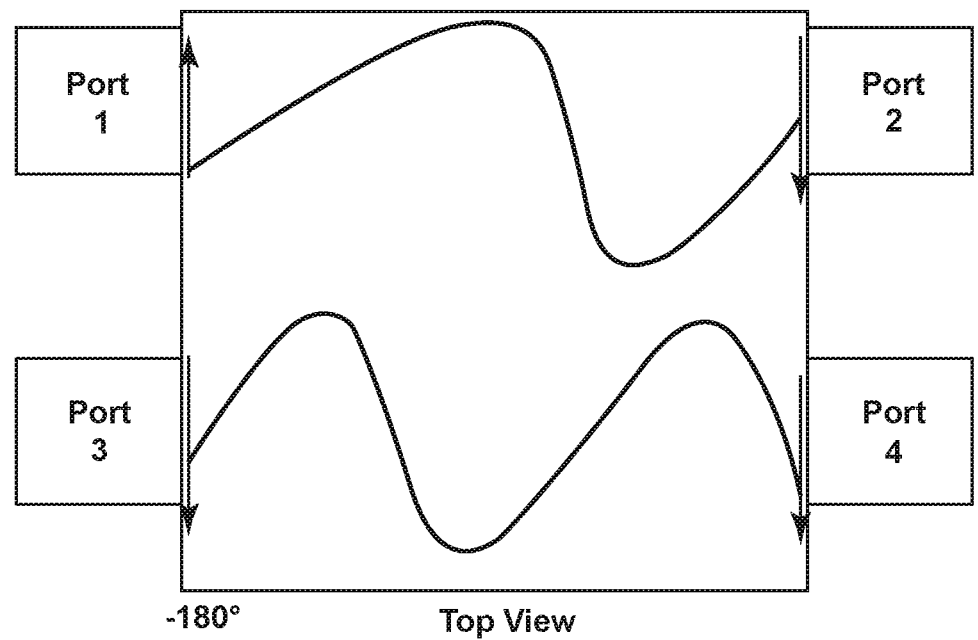
FIG. 14 is a diagram illustrating features of a method to characterize the unbalanced resonant modes of the cavity in accordance with various aspects described herein.
Figure 14:
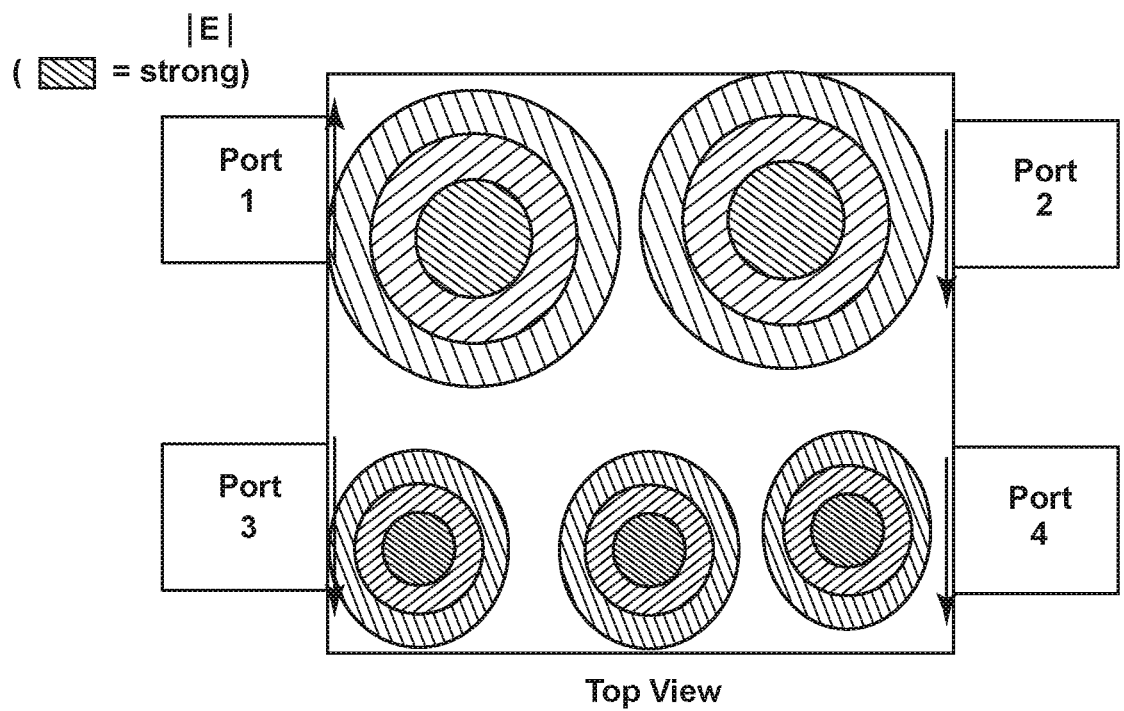
Figure 15:
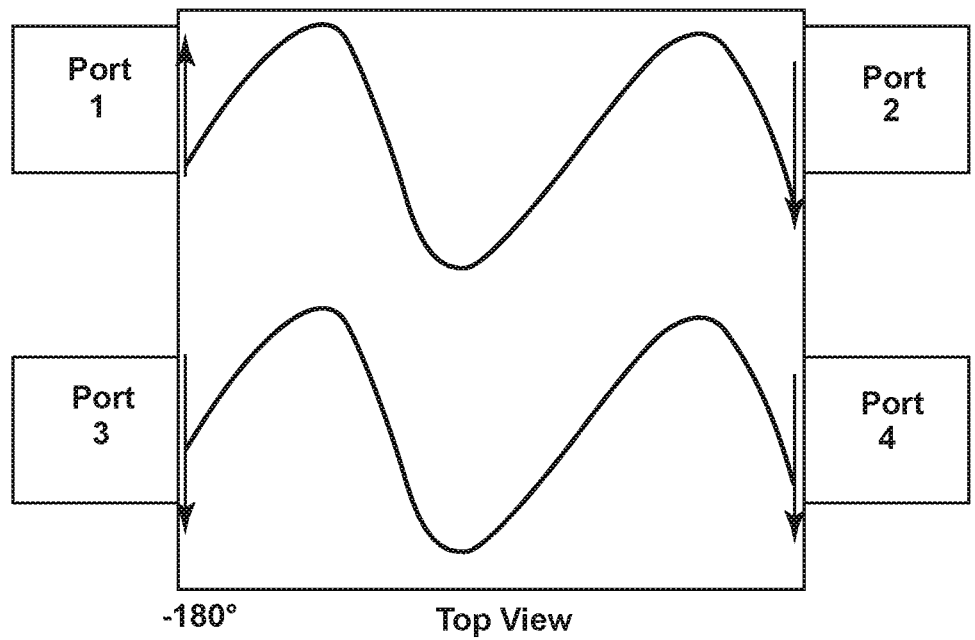
FIG. 15 is a diagram illustrating features of a method to characterize the balanced resonant modes of the cavity in accordance with various aspects described herein.
Figure 15:
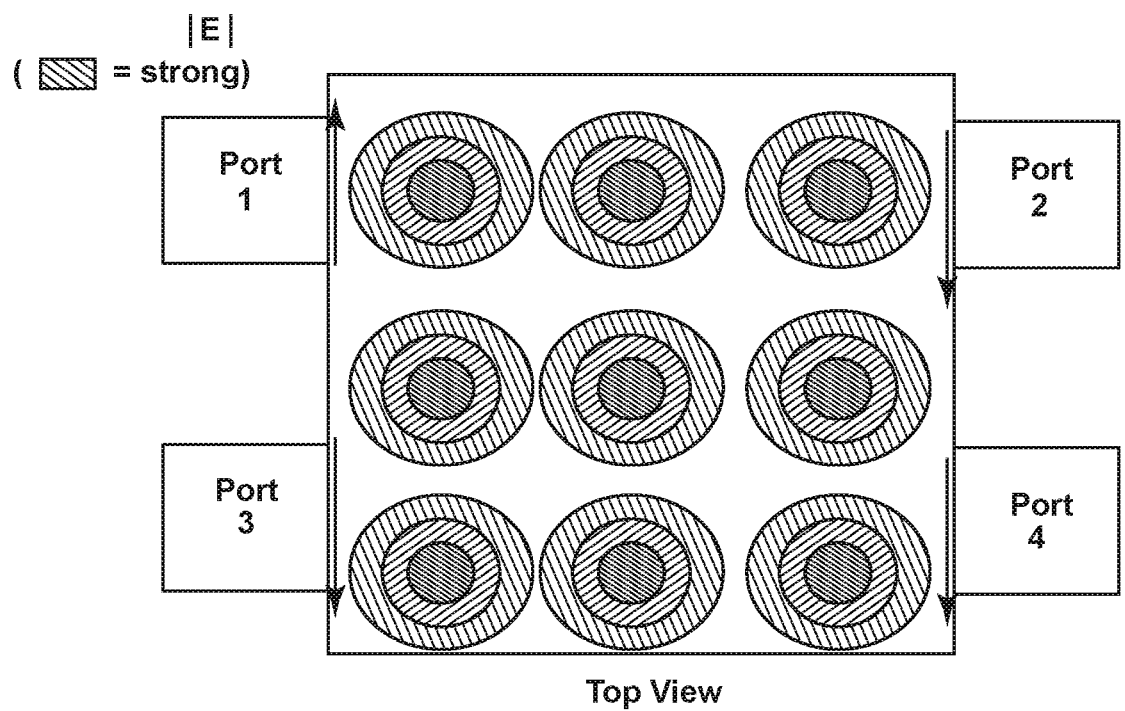

FIG. 14 is provided to show an example of an unbalanced excitation in the enclosed cavity 222 and the resulting heating pattern. FIG. 15 is provided to show an example of a balanced excitation in the enclosed cavity 222 and the resulting heating pattern.

Below is a list that shows the resonant modes classified according to their symmetry and provided with their critical frequencies and efficiencies. The values shown are for purposes of example.

Symmetry 1 (even, average efficiency=79%)
Mode 1 (frequency=2.40 GHz, efficiency=70%)
Mode 2 (frequency=2.41 GHz, efficiency=95%)
Mode 3 (frequency=2.45 GHz, efficiency=80%)
Mode 4 (frequency=2.50 GHz, efficiency=72%)
Symmetry 2 (odd, average efficiency=79%)
Mode 1 (frequency=2.40 GHz, efficiency=69%)
Mode 2 (frequency=2.41 GHz, efficiency=78%)
Mode 3 (frequency=2.45 GHz, efficiency=90%)

Figure 16:
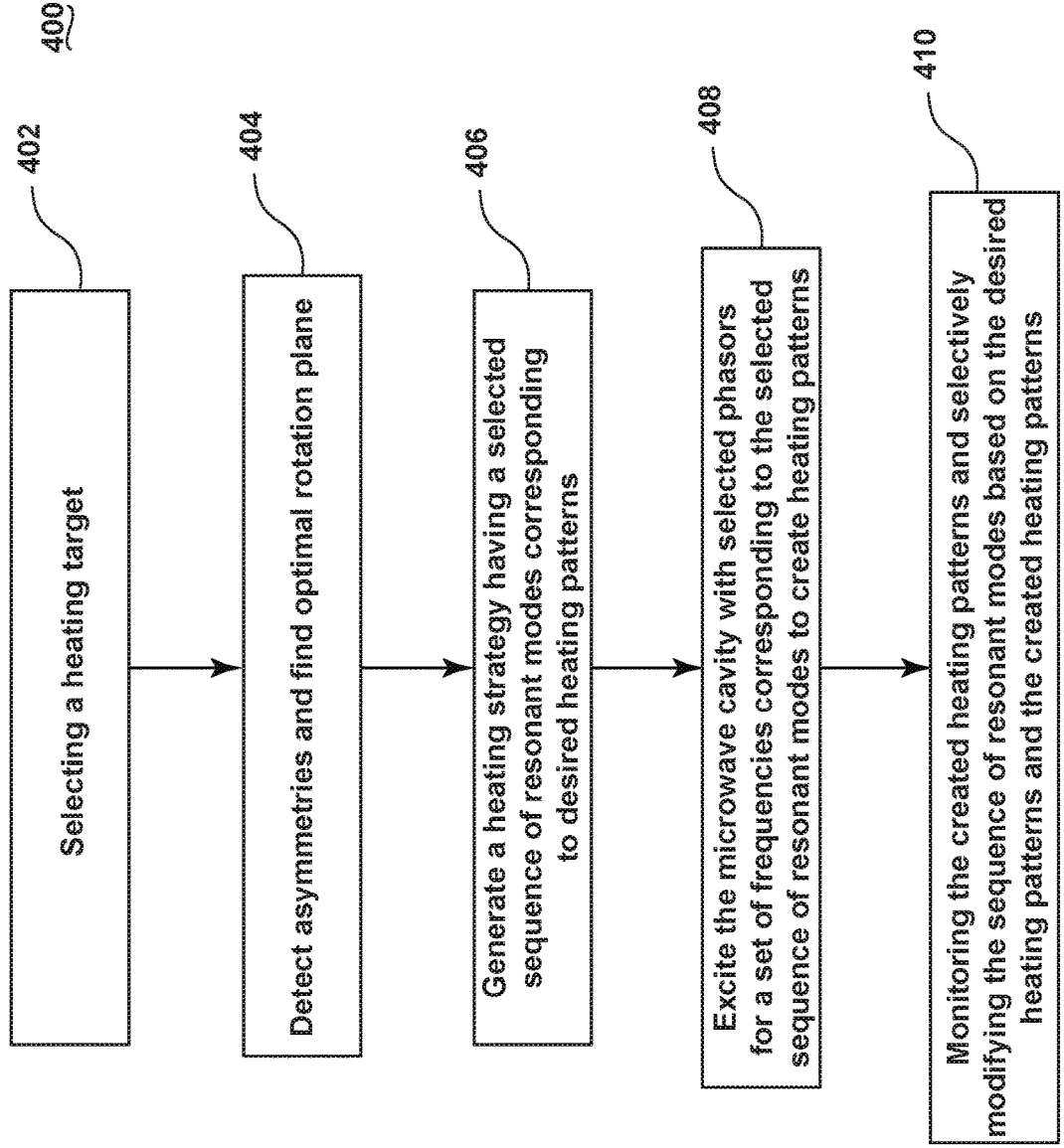
FIG. 16 is a flowchart illustrating a method of exciting an enclosed cavity with radio frequency radiation in accordance with various aspects described herein.

The controller 14 may be configured to perform a method (400) of activating a sequence of preclassified resonant modes into an enclosed cavity 20, 222 to control a heating pattern therein with RF radiation from a plurality of RF feeds 26A-26D, 226A-226B shown in FIG. 16. The plurality of RF feeds 26A-26D, 226A-226B transfer the RF radiation into the enclosed cavity 20, 222 and measure the forward and backward power at the plurality of RF feeds 26A-26D, 226A-226B. The method includes the steps of selecting a heating target corresponding to an amount of energy that is to be to delivered to each symmetry plane in the enclosed cavity 20, 222 based in part upon a load positioned in the enclosed cavity 20, 222 (step 402); detecting asymmetries and find the optimal rotation plane (step 404); generating a heating strategy based on the heating target to determine desired heating patterns, the heating strategy having a selected sequence of resonant modes to be excited in the enclosed cavity 20, 222 that correspond to the desired heating patterns (step 406); exciting the enclosed cavity 20, 222 with a selected set of phasors for a set of frequencies corresponding to each resonant mode of the selected sequence of resonant modes (step 408) to create heating patterns; and monitoring the created heating patterns based on the forward and backward power measurements at the RF feeds 26A-26D, 226A-226B to use closed-loop regulation to selectively modify the sequence of resonant modes into the enclosed cavity 20, 222 based on the desired heating patterns and the created heating patterns as monitored (step 410).

A heating target is an energy set point specified according to a symmetry plane in the enclosed cavity 20, 222. In other words, a heating target is the amount of energy that the microwave oven 10 is configured to deliver to each symmetry plane. Moreover, the target set point can be specified according to the ratio between the symmetry planes. For example, the target set point can be set as a 2:1 ratio for even and odd symmetry planes where the even symmetry plane is set to receive twice the energy as the odd symmetry plane.

The heating target is configured according to food load and cooking cycle requirements. For example, a balanced heating target may be configured for a reheat cycle. In another example, where two separate food loads like two small glasses are placed in a symmetric fashion with respect to the cavity center on left and right halves of the oven 10, the heating target can be configured for an even symmetry heating pattern.

Figure 17:
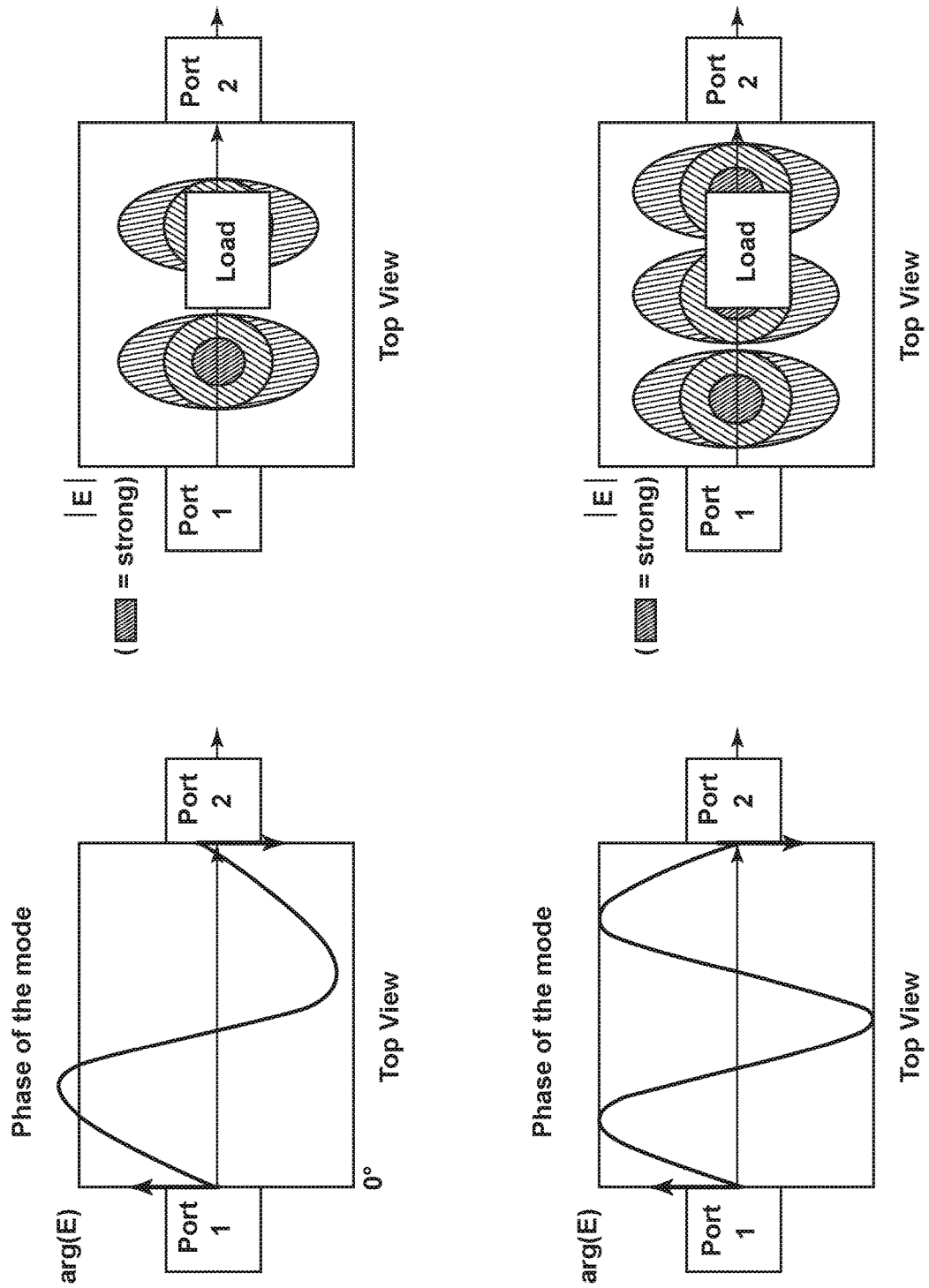
FIG. 17 is a diagram illustrating features of a method to characterize the unbalanced resonant modes of the cavity when a non-centered food load is present in accordance with various aspects described herein.

The spectromodal theory ensures that sources in phase and in anti-phase give rise to specific heating patterns that are symmetric with respect to the center of the cavity 20, 222. Thus, these patterns are suitable for managing centered food loads, but may be very susceptible to displacements, as highlighted in FIG. 17 where most of the energy is injected in the right side of the food load because of the overlapping of the two patterns.

Figure 18:
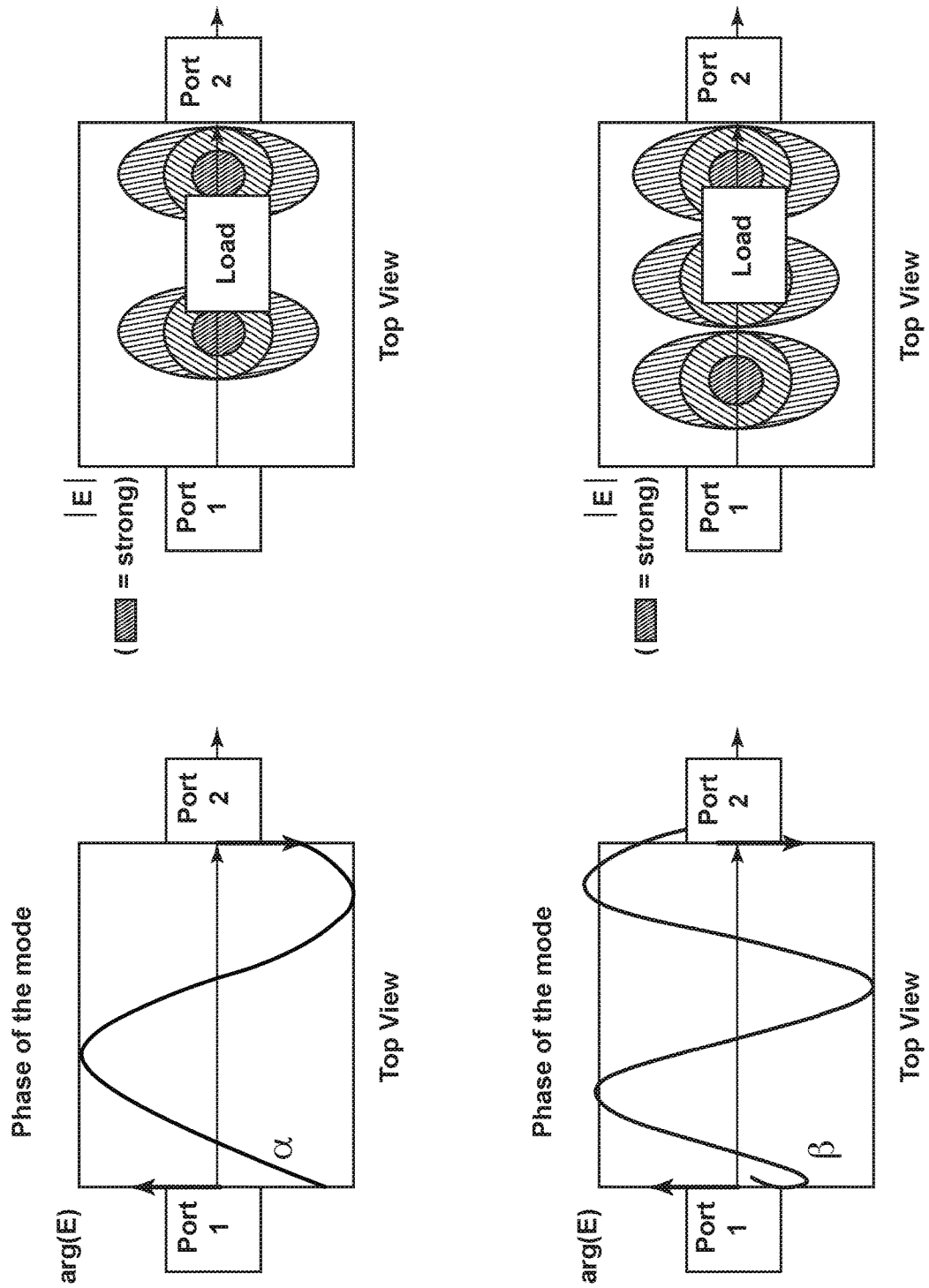
FIG. 18 is a diagram illustrating features of a method to characterize the balanced resonant modes of the cavity when a non-centered food load is present in accordance with various aspects described herein.

The point is that a non-centered food load introduces a rotation in the symmetry plane that causes the system oven-load to lose its symmetric properties. It is thus possible to compensate for this undesired scenario, identifying the rotation of the actual symmetry plane and applying it to the RF feeds 26A-26D, 226A-226B, hence changing their phase relationship, as depicted in FIG. 18 where α and β are the delta-phase between the RF feeds 26A-26D, 226A-226B.

This approach can be exploited to manage 3D displacements, i.e. on the width axis (as already described in FIG. 17), on the height axis and the depth axis, by just applying the RF feeds phase-shift to the proper symmetry plane.

The outcome of selecting a heating target in step 402 is a set of frequency-phase shift excitations for each RF feed 26A-26D, 226A-226B that couple with one specific resonant mode. The phase-shifts applied are the ones specific of each symmetry class, i.e. the natural phase shift that the classes of symmetries impose on the cavity 20, 222. These resonant modes might then be called 'unrotated' or 'nominal' resonant modes. The manner of identifying asymmetries and finding the optimal rotation plane (step 404) is described below.

The unrotated resonant modes selected refer to a symmetric ideal scenario, hence they might be suboptimal for an asymmetric scenario. Such an asymmetrical scenario may be caused by the position of the food load, or by the system itself (e.g., asymmetries in the manner in which the RF excitations are fed into the cavity). After identifying the unrotated resonant modes, the controller 14 checks whether they suit the actual system in order to find the optimal rotation that compensates for eventual asymmetries and thus provides optimized resonant modes. In some cases some of the unrotated resonant modes may turn out to not require rotation for efficiency optimization. Accordingly, not all optimized resonant modes are rotated. Step 402 is made up of different substeps: (1) phasors excitations; (2) excitations analysis; (3) resonant mode rotation; and (4) use of power and phase sensors (vector) instead of power sensors (scalar).

For the first substep (phasors excitations substep (1)), after having selected a nominal phasor, it is possible to identify a set of excitations for each resonant mode to be analyzed, by acting on the phase-shifts and keeping the frequency locked for that resonant mode. Specifically, for each unrotated resonant mode, the controller 14 generates a set of excitations with the same frequency (of the nominal mode) and a combination of phase-shifts. The set of phases might be defined a-priori, statically defined on run-time, or even be adaptive according to different parameters. Furthermore, the phase-axis might include all the phase-shifts inside the analysis range or a few samples only, in order to save computational time at the expense of approximation.

The phase-shifts are not arbitrarily defined, since an excitation related to a specific symmetry plane might couple with another one if rotated too close to it. It is thus advantageous for the controller 14 to set proper bounds to the phase-axis.

The selected actuations may be stored together with their efficiencies, which can be calculated as:

Efficiency=(sum of input power−sum of reflected power)/(sum of input power).

Figure 19:
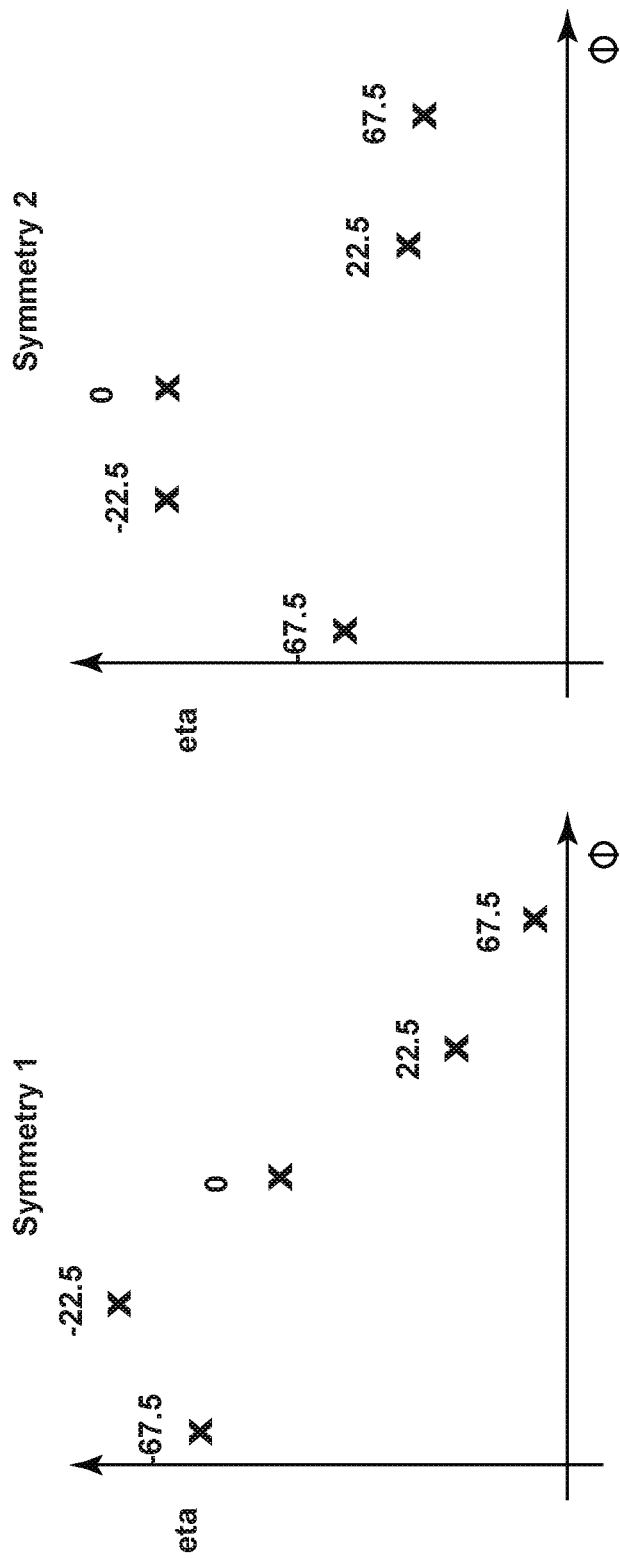
FIG. 19 are plots of the phase vs efficiency curves of one example for two symmetries.

For each mode of each symmetry class, the map phasor/efficiency is stored, i.e. if a cavity has two ports with two possible classes and two modes for each one has been selected, four sets of excitations will be performed, each set with all the defined phase-shifts, thus obtaining four sets of efficiency measurements to be further analyzed. A visual example is shown in FIG. 19 where for each resonant mode, the controller 14 performs the following:

for symmetry 1 the phasors ψ are abs(ψ)=1, arg(ψ)=e^jf0−φ with φ={−67.5°, −22.5°, 0°, 22.5°, 67.5°} for both ports; and for symmetry 2 the phasors ψ are abs(ψ)=1, arg(ψ)=e^jf0−φ with φ={−67.5°, −22.5°, 0°, 22.5°, 67.5°} for port 1 and φ=−180°−{−67.5°, −22.5°, 0°, 22.5°, 67.5°} for port 2.

The recorded map of efficiency is then analyzed in the second substep (excitations analysis substep (2)) in order to find the phase-shift that optimizes efficiency, since theoretically the efficiency vs phase curve should follow a sinusoidal trend with a maximum on the actual symmetry plane of the system (which is 0° for symmetric ones).

Figure 20:
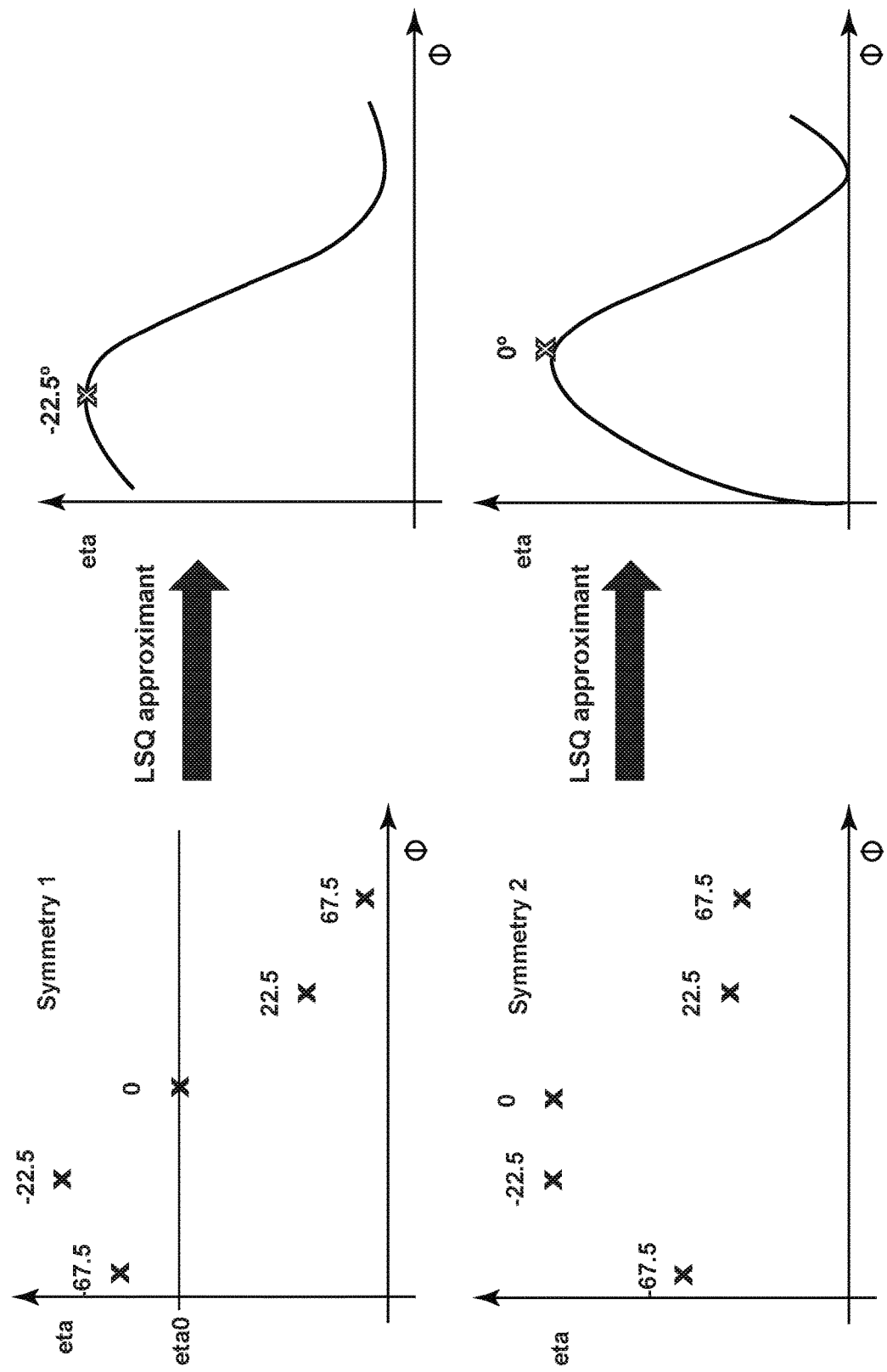
FIG. 20 are plots of the phase vs efficiency curves of another example for two symmetries.

Different strategies might be adopted in order to draw the efficiency vs phase curve, depending on the choices made at the previous stage. If all the phase-axis has been considered, it is enough to scan the excitations and find the one with the highest efficiency. Otherwise it is possible to apply an interpolation algorithm (linear, spline etc.) or even to define a model exploiting the a-priori knowledge about the trend of the curve (LSQ, linear regression etc.). A visual example is shown in FIG. 20.

It is also worth noticing that, since the rotation of the axis is the combination of the phase-shifts between each pair of RF feeds 26A-26D, 226A-226B and thus locking one source/source phase relationship to a value has an impact on all the other relationships, the maximum detection on one phase direction is correlated to all of the others. Hence, the optimal combination of the phase-shifts is not equal to the combination of the optimum for each direction taken separately.

This leads to an optimization problem of a (nport−1)-dimensional function, so for a 4-port microwave oven 10 the maximum has to be searched in a 3-dimensional plane.

For instance, given a 4-port microwave oven 10 and a phase-axis to be scanned made of four elements[−pi/4−pi/8+pi/8+pi/4] all the possible combinations of the phase-shifts between the ports is (provided that one is taken as reference, so the phase does not change):

(nport−1)^{nphi}=3^4=81

Hence, while in a 2-port microwave oven 10 there is only one efficiency-phase curve to study, in a more complex system the number of excitations and sensing needed to find the actual optimum rotation might dramatically increase.

For example, for a three-port system:

$$Sx = y$$

$$\begin{bmatrix} s11 & s12 & s13 \\ s21 & s22 & s23 \\ s31 & s32 & s33 \end{bmatrix} \begin{bmatrix} x1 \\ x2 \\ x3 \end{bmatrix} = \begin{bmatrix} y1 \\ y2 \\ y3 \end{bmatrix}$$

$$p(y1) \sim y1 * y1^* = [s11\ x1]^2 + [s12\ x2]^2 +$$
$$[s13\ x3]^2 + 2[s11\ s12\ x1\ x2]\cos(\varphi x1 - \varphi x2 - \varphi s11 - \varphi 12) +$$
$$2[s11\ s13\ x1\ x2]\cos(\varphi x1 - \varphi x3 - \varphi s11 - \varphi 13) +$$
$$2[s13\ s12\ x2\ x3]\cos(\varphi x2 - \varphi x3 - \varphi s13 - \varphi 12)$$

The 'free' phase shifts in the previous equation (i.e. the quantities to be controlled) are a number of three while the control variables are just two. This stems from the fact that the given the phase shift between the first and the second port (φx1−φx2) and the phase shift between the first and the third port (φx1−φx3) the last phase shift (φx2−φx3) is not a control variable but satisfies the previous two equations. That means that the number of control variables is less than the number of variables to be controlled and no optimal control is possible optimizing one factor at a time.

Different approaches might be used to find the solution, such as:
- solve the full problem;
- approximate the full problem with a heuristic function;
- consider all the sub-problems separately and combine the results (as depicted in the FIG. 20); or
- consider just one or a subset of the sub-problems (the most meaningful ones with respect to a specific criterion) and solve it/them exactly or even approximately.

Once the optimal rotation plane has been found, the resonant mode is changed accordingly per the third substep (resonant mode rotation substep (3)). From reconciling the information from all the symmetry planes it is possible to have the full picture of the resonant modes available in the cavity classified per class of symmetry.

Following substep (3), phase sensors are used to collect the S-matrix of the system (scattering matrix) in the fourth substep (use of power and phase sensors substep (4)). The scattering matrix makes it possible to perform the spectromodal excitation without actually exciting the system. It is possible instead to apply the equation:

$$Sx=y$$

where S is the scattering matrix of the system and x are the input phasors and y are the output phasors and compute the input and reflected powers as:

input power=$x*\text{conj}(x)$ output power=$y*\text{conj}(y)$ where conj denotes the complex conjugate.

As noted above the efficiency can be calculated as:

Efficiency=(sum of input power−sum of reflected power)/(sum of input power).

Figure 21:
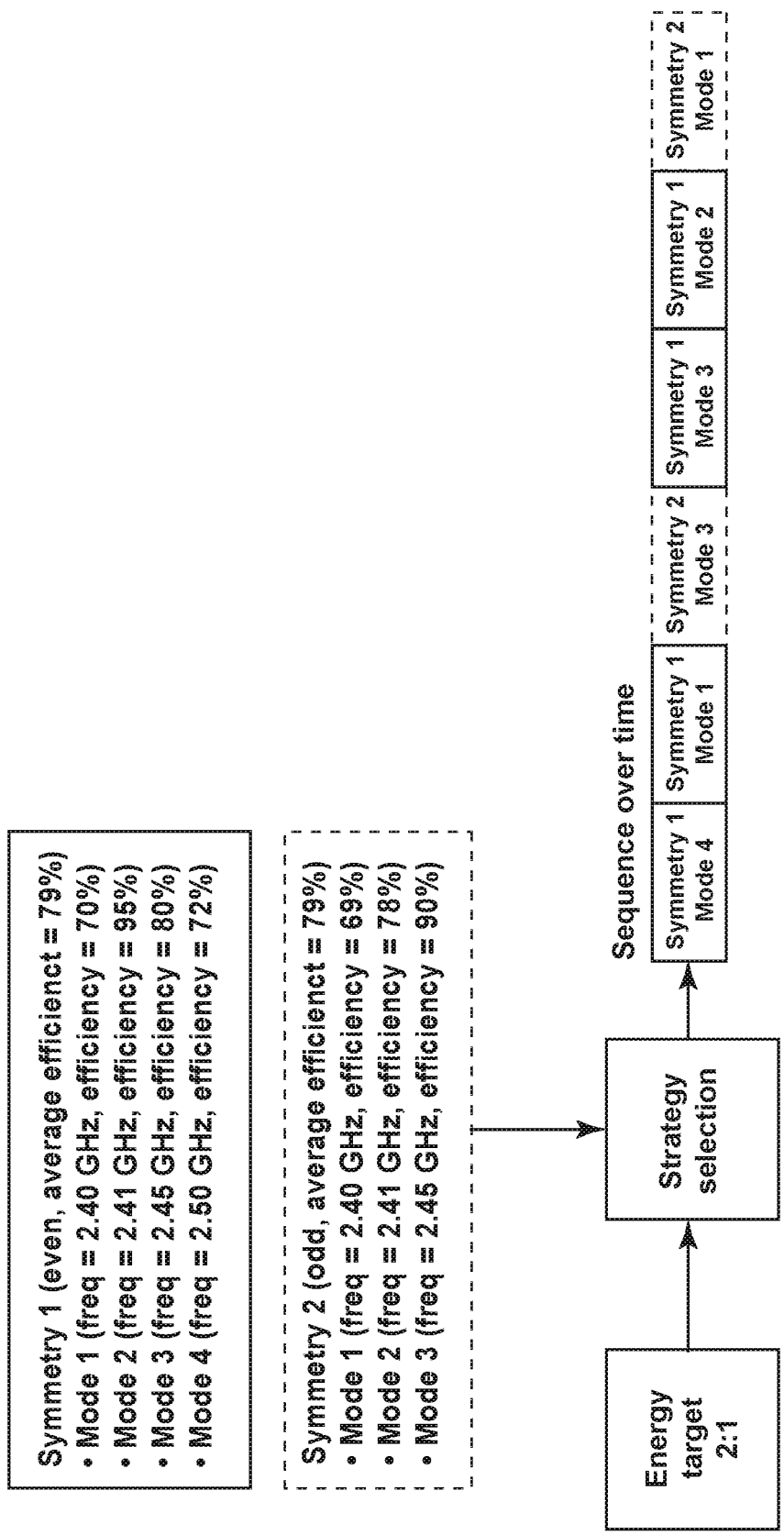
FIG. 21 is a block diagram illustrating an open-loop regulation of a heating strategy synthesis.

After detecting asymmetries and finding the optimal rotation plane (step 404) and thus the optimized resonant modes, the controller 14 generates a heating strategy (step 406) to utilize the optimized resonant modes. For a given heating strategy, a selected sequence of optimized resonant modes is stored in memory associated with controller 14. The microwave oven 10 will be configured to execute the selected sequence by applying the proper phase shifts and operating frequencies of the RF channels 40A-40D in order to activate the optimized resonant modes present in the list and couple energy to them in the enclosed cavity 20, 222. Each optimized resonant mode can be activated for a specific duration of time. For example, each mode can be excited for the same time duration or, in another example, each mode can be excited for a duration of time that is inversely proportional to the experimentally determined efficiency of the mode. Moreover, the sequence of optimized modes can include all the optimized resonant modes or just a subset that is proportional to the heating target ratio. Expanding upon the earlier example of a target ratio of 2:1, the sequence of optimized modes can include twice the number of resonant modes belonging to the first symmetry plane with respect to the number of resonant modes belonging to the second symmetry plane. The resonant modes belonging to a certain symmetry can be interleaved with resonant modes belonging to the other symmetry so as not to apply the same heating pattern for too much time that can detrimentally affect heating performance. In another example, the sequence of optimized modes can be selected such that the sum of the inverse efficiencies of the modes belonging to a first symmetry and the sum of the inverse efficiencies of the modes belonging to a second symmetry are selected to satisfy the ratio target energy. In another example, the microwave oven 10 can realize the energy target set point by regulating the power output used for the RF channels 40A-40D. Collectively, the above described examples represent an open-loop operation where the heating strategy is set and then applied. An example of the open-loop algorithm is depicted in FIG. 21.

After the heating strategy is generated in step 406, the controller 14 excites the enclosed cavity 20, 222 with a selected set of phasors for a set of frequencies corresponding to each of the selected sequence of resonant modes through RF feeds 26A-26D, 226A-226B (step 408).

Figure 22:
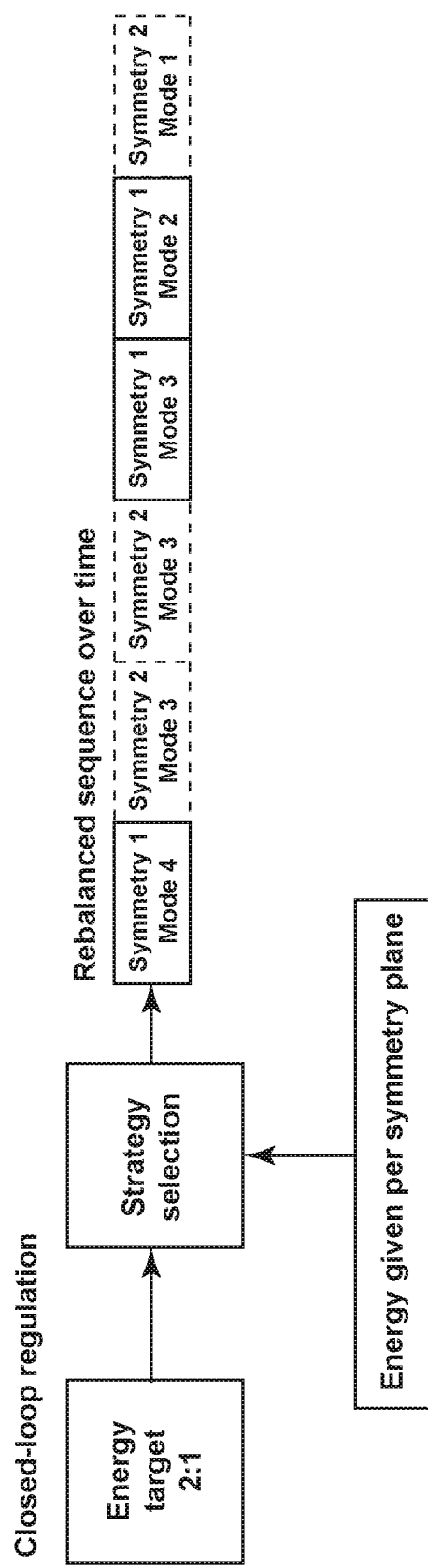
FIG. 22 is a block diagram illustrating a closed-loop regulation of a heating strategy synthesis.

In operation, the controller 14 can implement closed-loop regulation (step 410) by using an integrated amplifier power measurement system 150 to detect the energy delivered to the load or a proxy of delivered energy such as the efficiency, in order to determine the net power balance expressed as the total input power less the total reflected power. The energy measurement can be integrated in an accumulator relative to the current symmetry plane. At specified intervals of time, the controller 14 uses closed-loop regulation to rebalance the actuation sequence of the excited modes to increase or decrease the number of actuations for a specific symmetry plane to better achieve the required energy target set point. In another example, the controller 14 can use closed-loop regulation to adjust the power applied to the enclosed cavity 20, 222 for a specific symmetry plane or a specific mode. An example of the closed-loop algorithm is depicted in FIG. 22. Notice in the example that after the rebalancing, the number of optimized resonant modes in the first symmetry plane is reduced by one. The controller 14 may also monitor the energy (or a proxy) in order to obtain feedback about the axis of rotation applied.

Figure 23A:
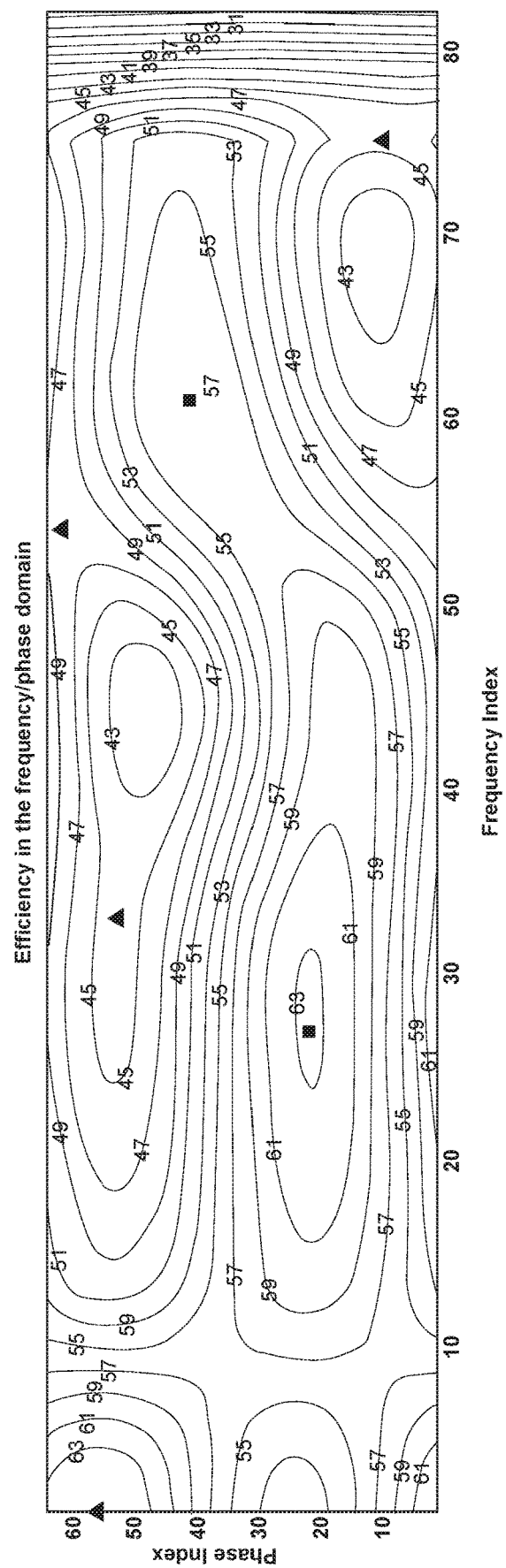
FIG. 23A is an efficiency map of one example of a food load in the enclosed cavity where the cooking appliance includes two ports.
Figure 23B:
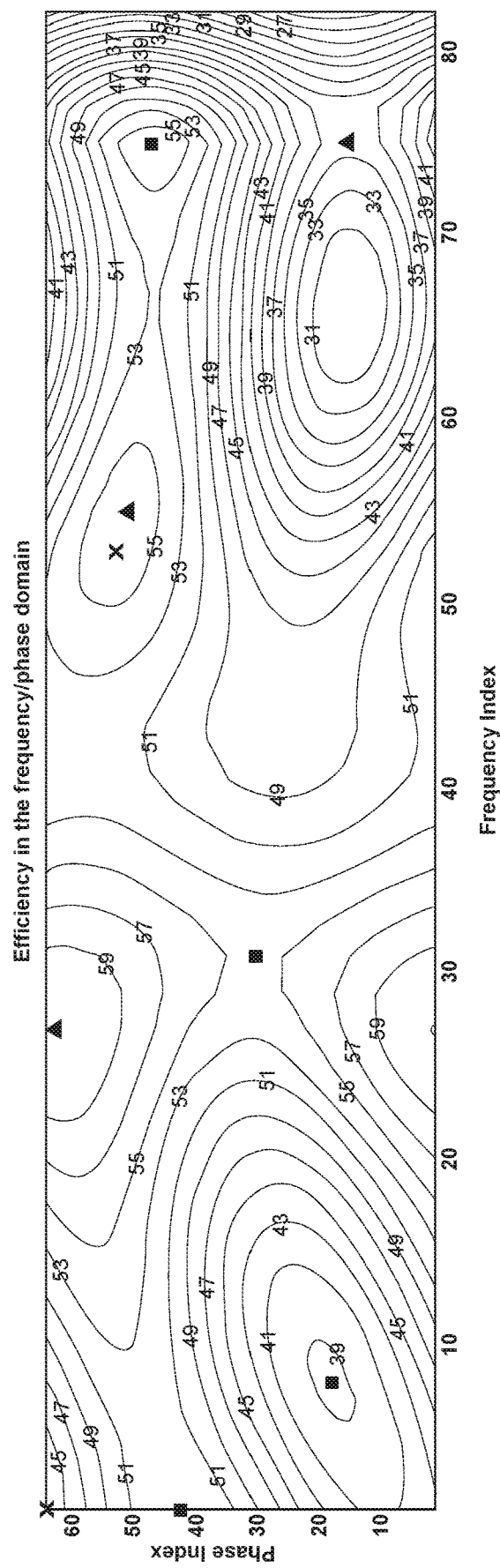
FIG. 23B is an efficiency map of one example of a food load in the enclosed cavity where the cooking appliance includes four ports.

FIG. 23A is an efficiency map of one example of a food load in the enclosed cavity where the cooking appliance includes two ports. FIG. 23B is an efficiency map of one example of a food load in the enclosed cavity where the cooking appliance includes four ports. Thus these efficiency maps are a frequency/phase representation of two different states. In each map, the resonant modes are marked with squares/triangles with respect to the symmetry plane in which they lie. The cross marker shown in FIG. 23B depicts a resonant mode that the algorithm has filtered for some reason (for example, because it is too close to another one).

Figure 24A:
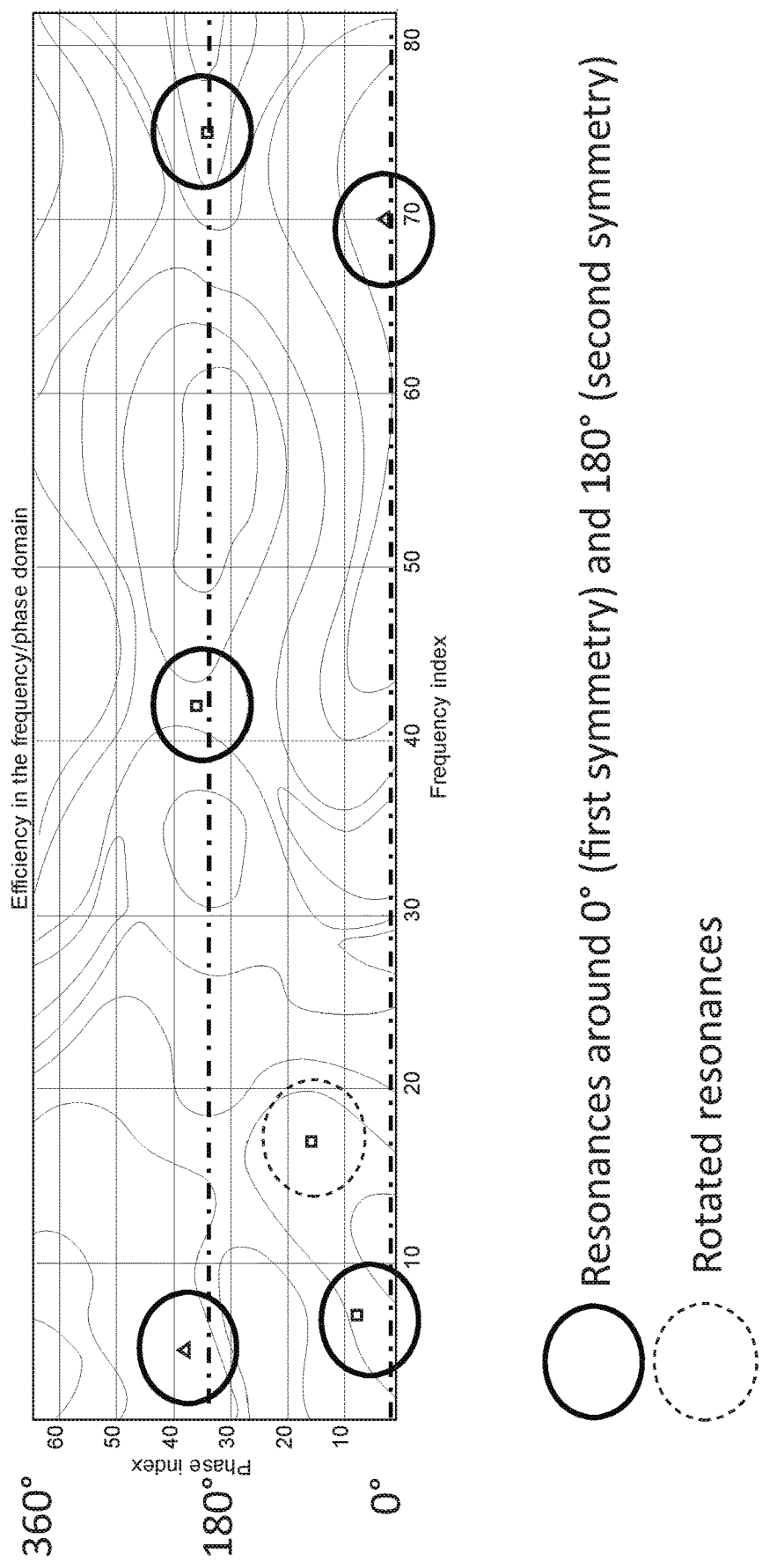
FIG. 24A is an efficiency map of an example where the system is mostly symmetric and most of the resonances are not rotated.
Figure 24B:
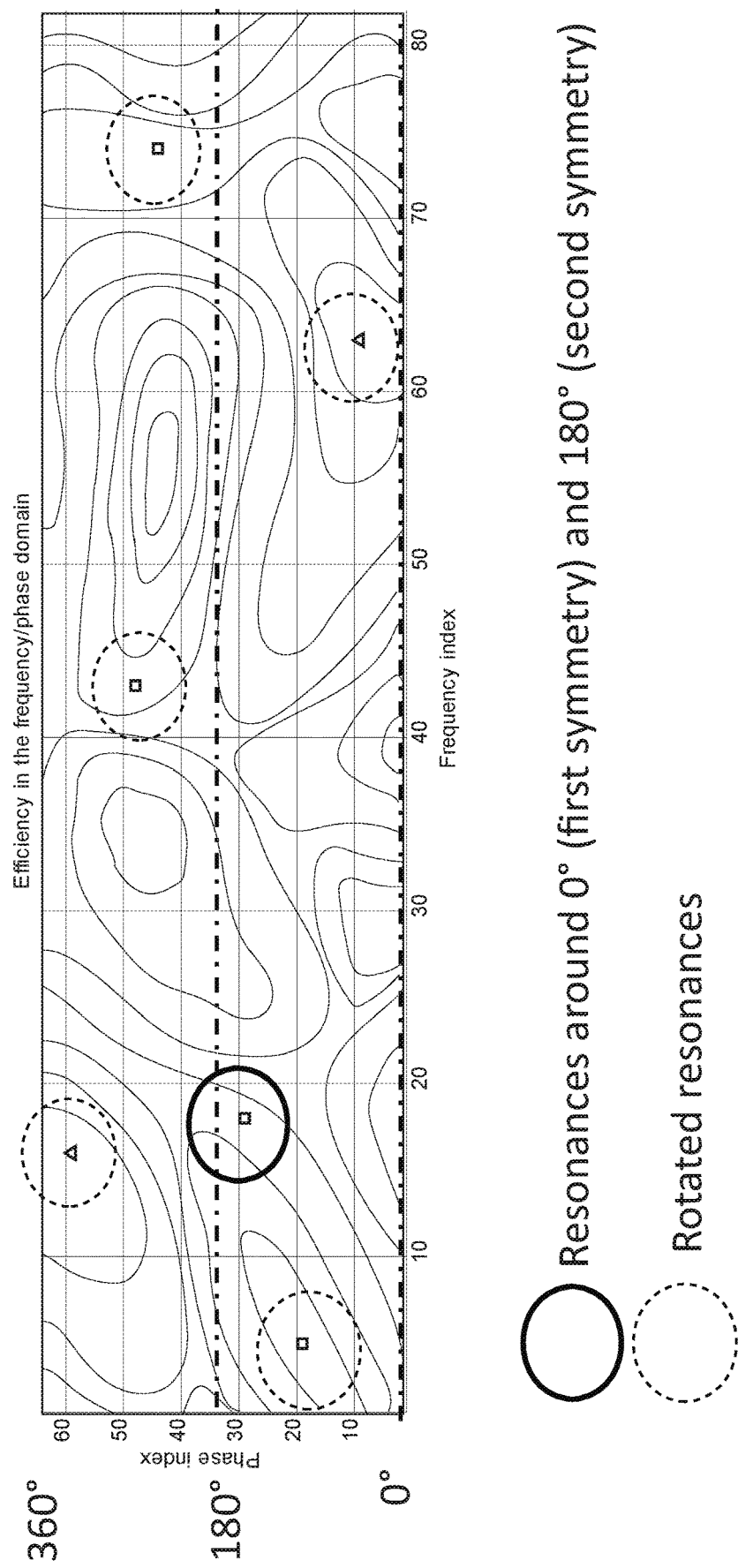
FIG. 24B is an efficiency map of an example where the system is mostly asymmetric and most of the resonances are rotated.

FIG. 24A shows an example of an efficiency map in the frequency/phase domain where the system is mostly symmetrical and most of the resonances are around 0° (first symmetry plane) and 180° (second symmetry plane). Such resonances would not need to be rotated. In this example, the highest efficiency (coupling) is obtained using the nominal axis (first: 0°, second 180°). FIG. 24B shows an example of an efficiency map in the frequency/phase domain where the system is asymmetrical and most of the resonances are not around either 0° (first symmetry plane) or 180° (second symmetry plane). Such resonances may be subject to rotation. In this example, the highest efficiency (coupling) is obtained applying specific rotations to each pole. If the nominal axis (first: 0°, second 180°) were used, a lower efficiency would be obtained.

Figure 25:
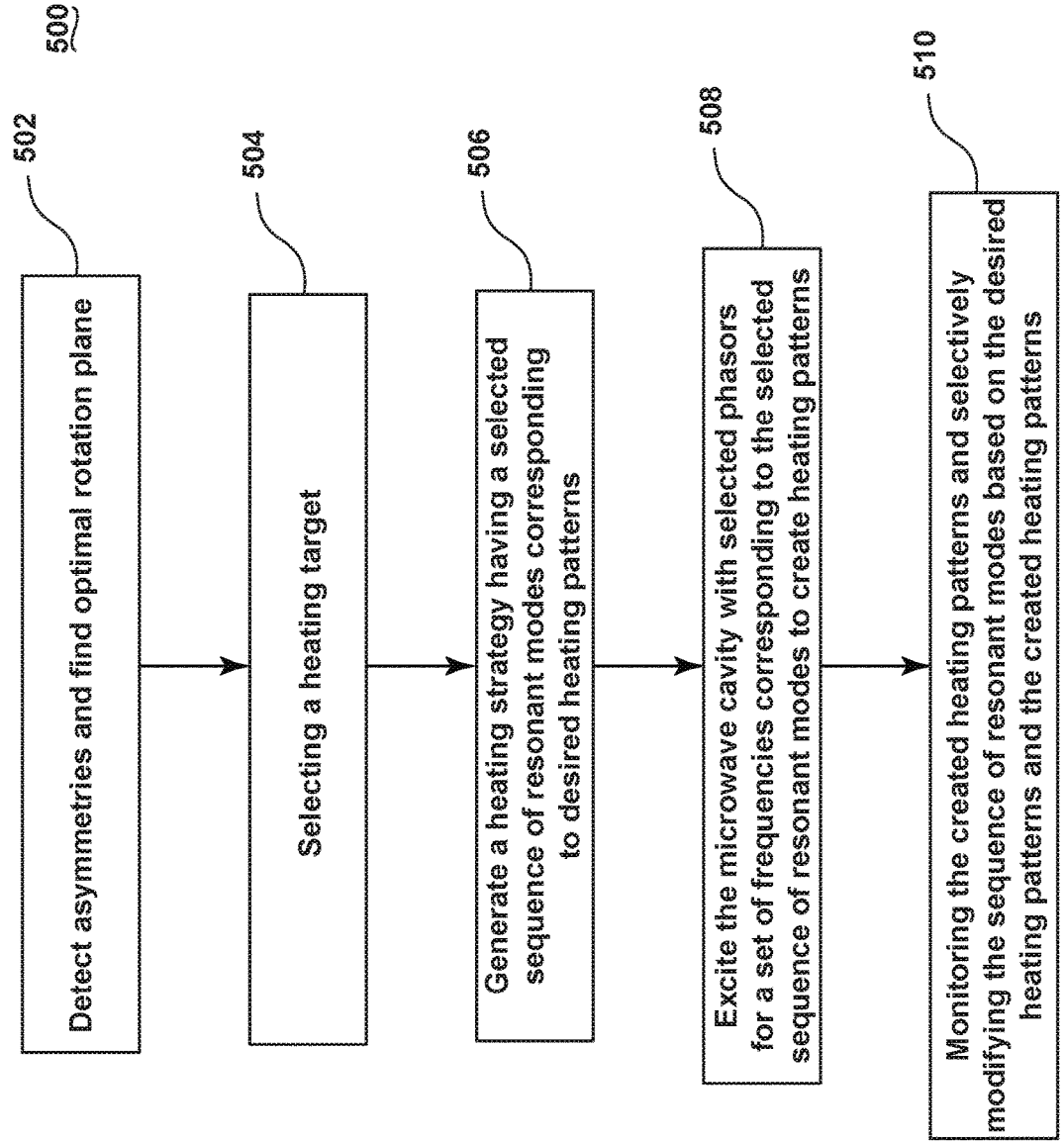
FIG. 25 is a flowchart illustrating an alternative method of exciting an enclosed cavity with radio frequency radiation in accordance with various aspects described herein.

An alternative to the approach described above is discussed below with reference to FIG. 25. Here, the controller 14 may be configured to perform a method (500) of activating a sequence of preclassified resonant modes into an enclosed cavity 20, 222 to control a heating pattern therein with RF radiation from a plurality of RF feeds 26A-26D, 226A-226B shown in FIG. 25. The plurality of RF feeds 26A-26D, 226A-226B transfer the RF radiation into the enclosed cavity 20, 222 and measure the forward and backward power at the plurality of RF feeds 26A-26D, 226A-226B. The method includes the steps of detecting asymmetries and finding the optimal rotation plane (step 502); selecting a heating target corresponding to an amount of energy that is to be to delivered to each symmetry plane in the enclosed cavity 20, 222 based in part upon a load positioned in the enclosed cavity 20, 222 (step 504); generating a heating strategy based on the heating target to determine desired heating patterns, the heating strategy having a selected sequence of resonant modes to be transferred to the enclosed cavity 20, 222 that correspond to the desired heating patterns (step 506); exciting the enclosed cavity 20, 222 with a selected set of phasors for a set of frequencies corresponding to each resonant mode of the selected sequence of resonant modes (step 508) to create heating patterns; and monitoring the created heating patterns based on the forward and backward power measurements at the RF feeds 26A-26D, 226A-226B to use closed-loop regulation to selectively modify the sequence of resonant modes into the enclosed cavity 20, 222 based on the desired heating patterns and the created heating patterns as monitored (step 510).

In method 500, the steps of detecting asymmetries and finding the optimal rotation plane (step 502) and selecting a heating target (step 504) are performed in a reversed order than in method 400 described above with respect to FIG. 16. In addition, the details of these two steps are different. Specifically, in step 402, the first, second, and third substeps (phasors excitations substep (1), excitations analysis substep (2), and resonant mode rotation substep (3)) are now performed in the asymmetry detecting step 502 rather than the heating target selection step 504. To find optimum rotations, the controller 14 generates a preselected set of excitations to find frequencies representing unrotated resonant modes and then generates excitations in a small region close to those frequencies representing resonant modes while shifting the phases and measuring the resulting efficiencies. If a specific phase at a frequency leads to an increase in efficiency, the optimized resonant mode is the phase-shifted one, and the rotation is the phase shift. Thus, in step 502, substep (1), the controller 14 first excites the cavity with a plurality of pre-selected frequencies to identify unrotated resonant modes and then identifies a set of excitations for each unrotated resonant mode to be analyzed by acting on a plurality of phase-shifts and keeping the frequency locked for that resonant mode. Specifically, for each unrotated resonant mode, the controller 14 generates a set of excitations with the same frequency (of the nominal mode) and a combination of phase-shifts. The set of phases might be defined a-priori, statically defined on run-time, or even be adaptive according to different parameters. Furthermore, the phase-axis might include all the phase-shifts inside the analysis range or a few samples only, in order to save computational time at the expense of approximation. The phase-shifts are not arbitrarily defined, since an excitation related to a specific symmetry plane might couple with another one if rotated too close to it. It is thus advantageous for the controller 14 to set proper bounds to the phase-axis.

The selected actuations may be stored together with their efficiencies. For each mode of each symmetry class, the map phasor/efficiency is stored, i.e. if a cavity has two ports with two possible classes and two modes for each one has been selected, four sets of excitations will be performed, each set with all the defined phase-shifts, thus obtaining four sets of efficiency measurements to be further analyzed.

The recorded map of efficiency is then analyzed in the second substep (excitations analysis substep (2)) in order to find the phase-shift that optimizes efficiency, since theoretically the efficiency vs. phase curve should follow a sinusoidal trend with a maximum on the actual symmetry plane of the system.

Once the optimal rotation plane has been found, the resonant mode is changed accordingly per the third substep (resonant mode rotation substep (3)). From reconciling the information from all the symmetry planes it is possible to have the full picture of the resonant modes available in the cavity classified per class of symmetry. Additional details of substeps (1)-(3) are described above with respect to FIG. 16.

In step 504, a heating target is then selected corresponding to an amount of energy that is to be to delivered to each symmetry plane in the enclosed cavity based in part upon the food load positioned in the enclosed cavity where the heating target includes a plurality of resonant modes that are rotated using the selected rotations in the preceding step 502. Step 502 thus includes substep (4) of step 402 described above. When selecting a heating target, the controller 14 is further configured to select the heating target according to food load and cooking cycle requirements.

Following step 504, the controller 14 performs steps 506-510, which correspond to steps 406-410 of FIG. 16. Insofar as these steps are the same, the details of steps 506-510 are not provided. Instead, the description of steps 406-410 above is incorporated herein by reference.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An electromagnetic cooking device comprising:
   an enclosed cavity in which a food load is placed;
   a plurality of RF feeds configured to introduce electromagnetic radiation into the enclosed cavity to heat up and prepare the food load, the plurality of RF feeds configured to allow measurement of forward and backward power at the plurality of RF feeds; and
   a controller configured to:
      select a heating target corresponding to an amount of energy that is to be to delivered to each symmetry plane in the enclosed cavity based in part upon the food load positioned in the enclosed cavity where the heating target includes a plurality of unrotated resonant modes;
      detect asymmetries relative to a center of the enclosed cavity and select rotations for the plurality of unrotated resonant modes that compensate for the detected asymmetries so as to generate a plurality of optimized resonant modes;

generate a heating strategy based on the heating target and the selected rotations to determine a sequence of desired heating patterns, the heating strategy having a selected sequence of the plurality of optimized resonant modes to be excited in the enclosed cavity that corresponds to the sequence of desired heating patterns;

cause the RF feeds to output a radio frequency signal of a selected frequency, a selected phase value and a selected power level to thereby excite the enclosed cavity with a selected set of phasors for a set of frequencies corresponding to each resonant mode of the selected sequence of optimized resonant modes to create heating patterns; and monitor the created heating patterns based on the forward and backward power measurements at the RF feeds to use closed-loop regulation to selectively modify the sequence of optimized resonant modes into the enclosed cavity based on the desired heating patterns as monitored.

2. The cooking device of claim 1, wherein, when detecting asymmetries of the food load and selecting rotations for the plurality of unrotated resonant modes, the controller is further configured to:

determine the frequency of each of the plurality of unrotated resonant modes; and for each of the plurality of unrotated resonant modes, determine the rotation by generating a set of excitations with the frequency of the unrotated resonant mode with a combination of phase shifts and determining an electrical efficiency for each excitation so as to determine the phase shifts that optimize the electrical efficiency and to thereby determine the phase shifts that optimize the resonant mode.

3. The cooking device claim 1, wherein, when monitoring the created heating patterns, the controller is further configured to:

collect forward and reflected power measurements for the selected set of phasors; and determine an absorption spectrum for the selected set of phasors.

4. The cooking device of claim 1, wherein, when monitoring the created heating patterns, the controller is further configured to:

identify and classify the resonant modes of the enclosed cavity;

correlate an absorption spectrum and the resonant modes in the enclosed cavity; and access a stored map of critical frequencies and class of symmetries where a symmetry of the resonant mode determines the heating pattern in the enclosed cavity.

5. The cooking device of claim 1, wherein, when monitoring the created heating patterns, the controller receives from an integrated amplifier power measurement system, a detected energy delivered to the load or a proxy of delivered energy such as the efficiency, in order to determine a net power balance expressed as a total input power less a total reflected power.

6. The cooking device of claim 1, wherein, when selecting a heating target, the controller is further configured to select the heating target according to food load and cooking cycle requirements.

7. The cooking device of claim 1, wherein, when generating a heating strategy, the controller is further configured to determine a specific duration of time for each resonant mode to be activated in the sequence of resonant modes.

8. The cooking device of claim 1, wherein, when generating a heating strategy, the controller is further configured to interleave resonant modes belonging to a certain symmetry with resonant modes belonging to another symmetry.

9. The cooking device of claim 1, wherein, when generating a heating strategy, the controller is further configured to select a sequence of modes such that a sum of inverse efficiencies of modes belonging to a first symmetry and a sum of inverse efficiencies of modes belonging to a second symmetry satisfy a ratio target energy.

10. The cooking device of claim 1, and further comprising:

a set of high-power RF amplifiers coupled to the plurality of RF feeds, each high-power amplifier comprising at least one amplifying stage configured to output a signal that is amplified in power with respect to an input RF signal; and a signal generator coupled to the set of high-power RF amplifiers for generating the input RF signal;

wherein the controller causes the RF feeds to output a radio frequency signal of a selected frequency, a selected phase value and a selected power level by causing the signal generator and selected ones of the set of high-power amplifiers to output a radio frequency signal of a selected frequency, a selected phase value and a selected power level, wherein the selected frequency is selected from a set of frequencies in a bandwidth of radio frequency electromagnetic waves, the selected phase value is selected from a set of phase values of radio frequency electromagnetic waves, and the selected power level is selected from a set of power levels.

11. The cooking device of claim 1, wherein each of the plurality of RF feeds includes a waveguide coupled at one end to one of the high-power RF amplifiers and coupled at the other end to the enclosed cavity.

12. The cooking device of claim 1, wherein each of the plurality of RF feeds includes an integrated measurement system configured to output a digital signal indicative of the RF signal conveyed within the waveguide.

13. A method of activating a sequence of preclassified resonant modes into an enclosed cavity in which a food load is placed to control a heating pattern therein with RF radiation from a plurality of RF feeds, where the plurality of RF feeds transfer the RF radiation into the enclosed cavity and measure the forward and backward power at the plurality of RF feeds, the method comprising:

selecting a heating target corresponding to an amount of energy that is to be to delivered to each symmetry plane in the enclosed cavity based in part upon the food load positioned in the enclosed cavity where the heating target includes a plurality of unrotated resonant modes;

detecting asymmetries relative to a center of the enclosed cavity and select rotations for the plurality of unrotated resonant modes that compensate for the detected asymmetries so as to generate a plurality of optimized resonant modes;

generating a heating strategy based on the heating target and the selected rotations to determine a sequence of desired heating patterns, the heating strategy having a selected sequence of the plurality of optimized resonant modes to be excited in the enclosed cavity that corresponds to the sequence of desired heating patterns;

exciting the enclosed cavity with a selected set of phasors for a set of frequencies corresponding to each resonant mode of the selected sequence of optimized resonant modes to create heating patterns; and monitoring the created heating patterns based on the forward and backward power measurements at the RF feeds to use closed-loop regulation to selectively modify the sequence of optimized resonant modes into the enclosed cavity based on the desired heating patterns as monitored.

14. The method of claim 13, wherein the step of detecting asymmetries of the food load and selecting rotations for the plurality of unrotated resonant modes, comprises:
  determining the frequency of each of the plurality of unrotated resonant modes; and
  for each of the plurality of unrotated resonant modes, determining the rotation by generating a set of excitations with the frequency of the unrotated resonant mode with a combination of phase shifts and determining an electrical efficiency for each excitation so as to determine the phase shifts that optimize the electrical efficiency and to thereby determine the phase shifts that optimize the resonant mode.

15. The method of claim 13, wherein the step of monitoring includes:
  collecting forward and reflected power measurements for the selected set of phasors; and
  determining an absorption spectrum for the selected set of phasors.

16. The method of claim 13, wherein the step of monitoring includes:
  identifying and classifying the resonant modes of the enclosed cavity;
  correlating an absorption spectrum and the resonant modes in the enclosed cavity; and
  accessing a stored map of critical frequencies and class of symmetries where a symmetry of the resonant mode determines the heating pattern in the enclosed cavity.

17. The method of claim 13, wherein the step of monitoring includes using an integrated amplifier power measurement system to detect the energy delivered to the load or a proxy of delivered energy such as the efficiency, in order to determine a net power balance expressed as a total input power less a total reflected power.

18. The method of claim 13, wherein the step of selecting a heating target comprises selecting the heating target according to food load and cooking cycle requirements.

19. The method of claim 13, wherein the step of generating a heating strategy includes determining a specific duration of time for each resonant mode to be activated in the sequence of resonant modes.

20. The method of claim 13, wherein the step of generating a heating strategy includes interleaving resonant modes belonging to a certain symmetry with resonant modes belonging to another symmetry.

\* \* \* \* \*